United States Patent
Shafin et al.

(10) Patent No.: US 12,160,821 B2
(45) Date of Patent: Dec. 3, 2024

(54) APPARATUS AND METHOD FOR TRAFFIC DELAY INFORMATION REQUEST AND TRAFFIC OFFSET ALIGNMENT

(71) Applicant: Samsung Electronics Co., Ltd., Suwon-si (KR)

(72) Inventors: Rubayet Shafin, Allen, TX (US); Peshal Nayak, Plano, TX (US); Boon Loong Ng, Plano, TX (US); Wenxun Qiu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 17/643,146

(22) Filed: Dec. 7, 2021

(65) Prior Publication Data
US 2022/0201606 A1 Jun. 23, 2022

Related U.S. Application Data

(60) Provisional application No. 63/279,950, filed on Nov. 16, 2021, provisional application No. 63/208,298, (Continued)

(51) Int. Cl.
*H04W 52/02* (2009.01)
*H04L 1/1607* (2023.01)
*H04L 43/0852* (2022.01)

(52) U.S. Cl.
CPC ....... *H04W 52/0216* (2013.01); *H04L 1/1614* (2013.01); *H04L 43/0852* (2013.01)

(58) Field of Classification Search
CPC ............. H04W 52/0216; H04W 76/28; H04W 76/15; H04W 84/12; H04L 1/1614;
(Continued)

(56) References Cited

U.S. PATENT DOCUMENTS

| | | | |
|---|---|---|---|
| 11,523,306 B1* | 12/2022 | Chu | H04L 69/324 |
| 2010/0128617 A1* | 5/2010 | Aggarwal | H04W 56/009 370/252 |

(Continued)

FOREIGN PATENT DOCUMENTS

| | | |
|---|---|---|
| EP | 3522612 A1 | 8/2019 |
| WO | 2018010639 A1 | 1/2018 |

(Continued)

OTHER PUBLICATIONS

IEEE Standards Association; IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

(Continued)

*Primary Examiner* — Mandish K Randhawa

(57) ABSTRACT

Embodiments of the present disclosure provide methods and apparatuses for obtaining timing information and performing a time offset adjustment for target wake time (TWT) operations in a wireless network. The apparatuses include a first communication device comprising a transceiver and a processor operably coupled to the transceiver. The transceiver is configured to transmit, during a target wake time (TWT) setup phase, a TWT element including a request for information on a traffic delay of a second communication device and receive the information on the traffic delay. The processor is configured to determine a time offset to adjust a start time of a next TWT interval based on the information on the traffic delay.

20 Claims, 25 Drawing Sheets

Related U.S. Application Data filed on Jun. 8, 2021, provisional application No. 63/127,776, filed on Dec. 18, 2020.

(58) Field of Classification Search
CPC ............... H04L 43/0852; H04L 1/1678; H04L 49/90; H04L 47/28; H04L 47/283; Y02D 30/70

See application file for complete search history.

(56) References Cited

U.S. PATENT DOCUMENTS

| | | | |
|---|---|---|---|
| 2016/0309412 A1* | 10/2016 | Choi | .............. H04W 40/005 |
| 2017/0064625 A1 | 3/2017 | Sampath et al. | |
| 2017/0332385 A1 | 11/2017 | Shirali et al. | |
| 2019/0239226 A1 | 8/2019 | Chu et al. | |
| 2019/0253967 A1 | 8/2019 | Xiao et al. | |
| 2019/0306790 A1 | 10/2019 | Kottontavida et al. | |
| 2020/0015165 A1 | 1/2020 | Hwang et al. | |
| 2020/0137626 A1 | 4/2020 | Huang et al. | |
| 2020/0221381 A1 | 7/2020 | Homchaudhuri et al. | |
| 2023/0262768 A1* | 8/2023 | Ko | .............. H04W 52/0216 370/329 |

FOREIGN PATENT DOCUMENTS

| | | |
|---|---|---|
| WO | 2018174978 A3 | 9/2018 |
| WO | 2020146094 A1 | 7/2020 |

OTHER PUBLICATIONS

LAN/MAN Standards Committee of the IEEE Computer Society; IEEE P802.11ac/D8.0; Draft Standard for Information technology—Telecommunications and information exchange between systems Local and metropolitan area networks—Specific requirements; "Part 11: Wireless LAN Medium Access Control (MAC) and Physical Layer (PHY) Specifications" "Amendment 1: Enhancements for High Efficiency WLAN"; Oct. 2020, 820 pgs.

LAN/MAN Standards Committee of the IEEE Computer Society; IEEE P802.11be/D1.01; Draft Standard for Information technology—Telecommunications and information exchange between systems Local and metropolitan area networks—Specific requirements; "Part 11: Wireless LAN Medium Access Control (MAC) and Physical Layer (PHY) Specifications"; Amendment 8: Enhancements for extremely high throughput (EHT); Jun. 2011; 657 pgs.

International Search Report and Written Opinion issued Mar. 24, 2022 regarding International Application No. PCT/KR2021/019250, 9 pages.

Gan et al. (Huawei Technologies, Co. Ltd.), "TWT for MLD", doc.: IEEE 802.11-20/1680-00-00be, Nov. 2020, 7 pages.

Extended European Search Report issued Dec. 7, 2023 regarding Application No. 21907143.8, 10 pages.

"DMG and CMMG(11aj) channel access", IEEE P802.11-REVmd/D1.2, Jul. 2018, 195 pages.

Indian Patent Office, Examination Report issued May 17, 2024 regarding Application No. 202317018494, 6 pages.

* cited by examiner

| Element ID | Length | SCSID | Request Type | Intra-Access Category Priority element (optional) | TCLAS Elements (optional) | TCLAS Elements (optional) | Traffic delay request IE | Optional subelements |
|---|---|---|---|---|---|---|---|---|
| 1 | 1 | 1 | 1 | 0 or 3 | variable | 0 or 3 | 6 | variable |

Octets:

The "Traffic delay request IE" column is labeled 2102.

FIG. 21

APPARATUS AND METHOD FOR TRAFFIC DELAY INFORMATION REQUEST AND TRAFFIC OFFSET ALIGNMENT

CROSS-REFERENCE TO RELATED APPLICATION(S) AND CLAIM OF PRIORITY

This application claims priority under 35 U.S.C. § 119(e) to U.S. Provisional Patent Application No. 63/127,776 filed on Dec. 18, 2020, U.S. Provisional Patent Application No. 63/208,298 filed on Jun. 8, 2021, and U.S. Provisional Patent Application No. 63/279,950 filed on Nov. 16, 2021, which are hereby incorporated by reference in their entirety.

TECHNICAL FIELD

This disclosure relates generally to power management in wireless communications systems. Embodiments of this disclosure relate to methods and apparatuses for determining a traffic offset alignment for target wake time configuration for communications in a wireless local area network communications system.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the WI-FI 6 certification program for guaranteeing interoperability between certified products implementing IEEE 802.11ax amendment. In the market, device manufacturers are already starting to release WI-FI 6 certified smart mobile devices.

Target Wake Time (TWT) is one of the important features of the IEEE 802.11ax amendment. TWT enables wake time negotiation between an access point (AP) and an associated station (STA) for improving power efficiency. With TWT operation, it suffices for a STA to only wake up at pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

TWT allows the non-AP STAs to wake up at designated time only, and thereby reduce power consumption. Some applications (e.g., cloud gaming, AR glasses) can have periodic burst traffic with very strict latency requirements. In setting up TWT by a non-AP STA, the STA may not have the traffic delay information at the AP (i.e., arrival time of downlink traffic). It may lead to large delay between the DL traffic arrival time and TWT service period (SP) start time. This may severely affect latency-sensitive applications. If the non-AP STA has information on the traffic delay at the AP, it can accordingly adjust its TWT parameters and hence can better support TWT traffic.

Multi-link operation (MLO) is another key feature that is currently being developed by the standards body for next generation extremely high throughput (EHT) WI-FI systems, IEEE 802.11be. The WI-FI devices that support MLO are referred to as multi-link devices (MLD). With MLO, it is possible for a non-AP MLD to discover, authenticate, associate, and set up multiple links with an AP MLD. Channel access and frame exchange is possible on each link between the AP MLD and non-AP MLD.

When TWT agreements are set up over one or multiple links between an AP MLD and a non-AP MLD, the TWT requesting non-AP STAs affiliated with the non-AP MLD may not have traffic delay information at the peer STAs affiliated with the AP MLD. With this traffic delay information, non-AP STAs affiliated with non-AP MLD may select appropriate TWT parameters in order to support low-latency traffic over multiple links.

SUMMARY

Embodiments of the present disclosure provide methods and apparatuses for obtaining timing information and performing a time offset adjustment for target wake time (TWT) operations in a wireless network (e.g., a WLAN).

In one embodiment, a first communication device is provided, comprising a transceiver and a processor operably coupled to the transceiver. The transceiver is configured to transmit, during a target wake time (TWT) setup phase, a TWT element including a request for information on a traffic delay of a second communication device, and to receive the information on the traffic delay. The processor is configured to determine a time offset to adjust a start time of a next TWT interval based on the information on the traffic delay.

In another embodiment, a method performed by a first communication device is provided, including the steps of transmitting, during a target wake time (TWT) setup phase, a TWT element including a request for information on a traffic delay of a second communication device, receiving the information on the traffic delay, and determining a time offset to adjust a start time of a next TWT interval based on the information on the traffic delay.

In another embodiment, a second communication device is provided, comprising a transceiver. The transceiver is configured to receive, during a target wake time (TWT) setup phase, a TWT element including a request for information on a traffic delay of a second communication device, and to transmit the information on the traffic delay. A time offset to adjust a start time of a next TWT interval is determined based on the information on the traffic delay.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 21 illustrates an example of inclusion of traffic delay information request and response IEs in the SCS request and response framework of the 802.11 standard according to various embodiments of the present disclosure;

DETAILED DESCRIPTION

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that TWT operation between STAs in a WLAN can introduces latency if packets are ready to transmit before the start time of a next TWT interval. In order for a receiving-side STA to negotiate a start time for the next TWT interval that is properly aligned with the time with packets are ready to transmit from the transmitting-side STA, however, the receiving-side STA needs knowledge of timing information related to when packets arrive at the transmitting-side STA.

Accordingly, embodiments of the present disclosure provide apparatuses and methods that enable the receiving-side STA to request timing information from the transmitting-side STA, and that can generate timing offset adjustments for TWT operation based on timing information at the transmitting-side STA to reduce the latency induced by TWT operation.

Figure 1:
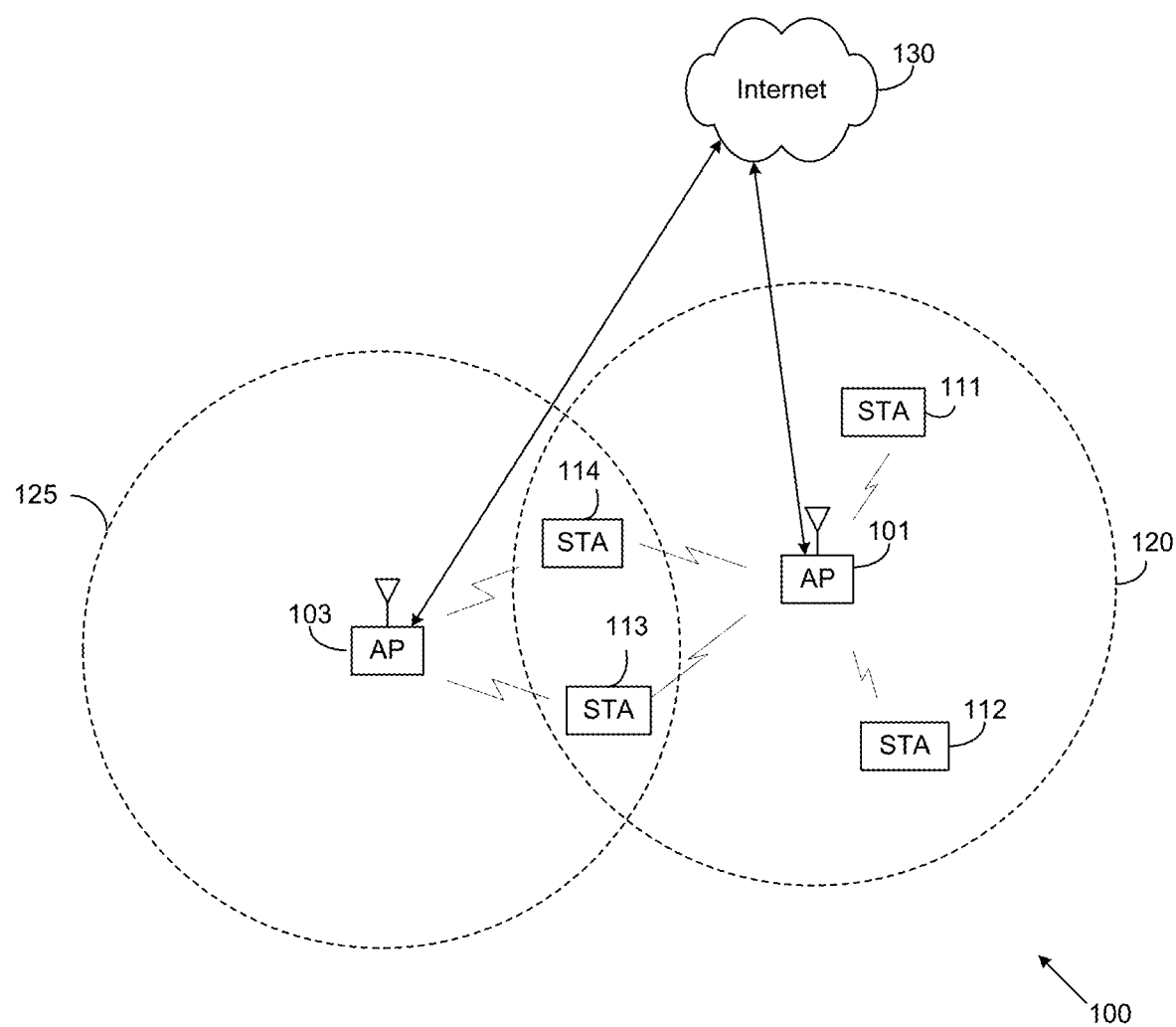
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for obtaining timing information and performing a time offset adjustment for target wake time (TWT) operations in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
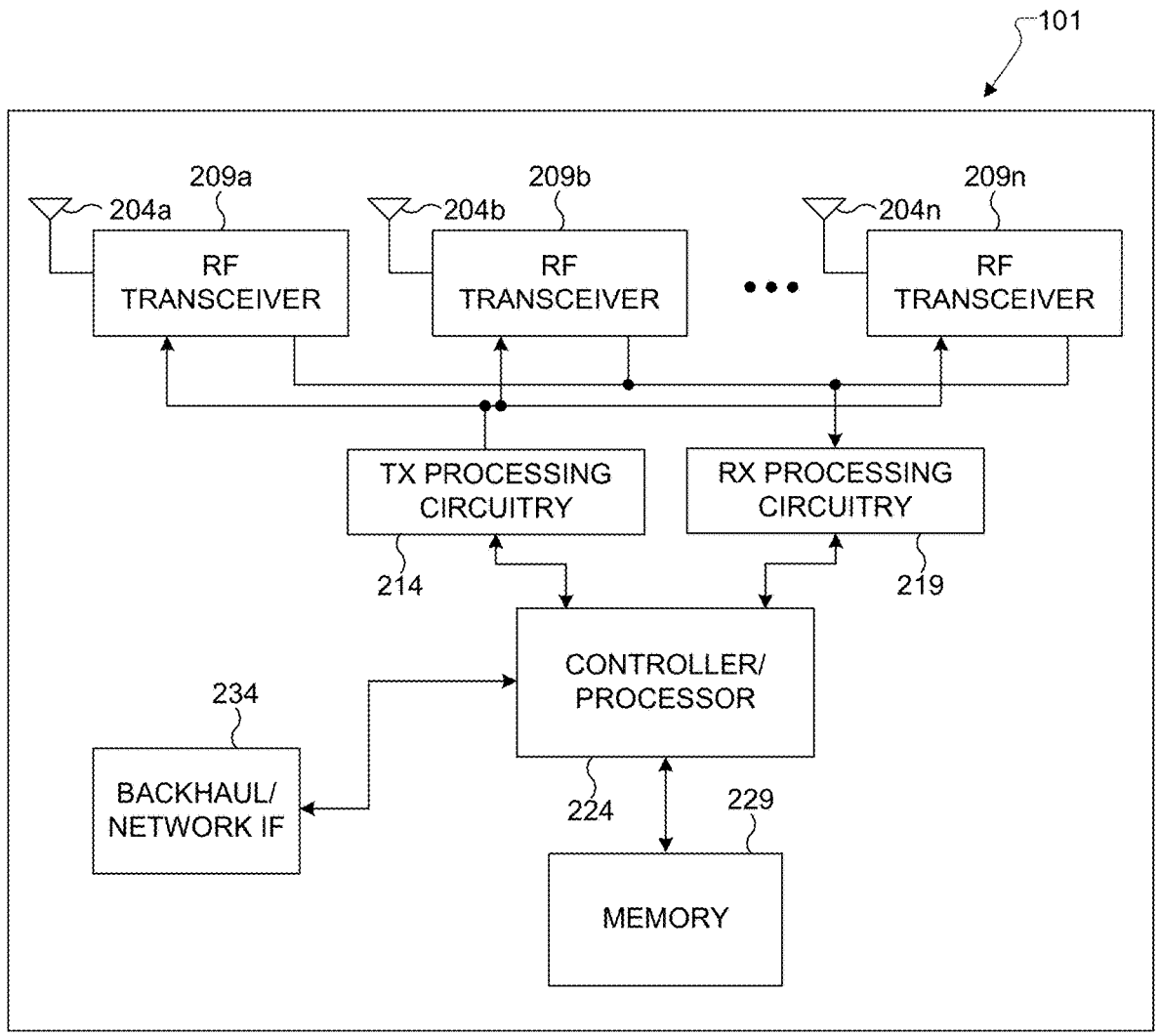
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including obtaining timing information and performing a time offset adjustment for TWT operations based on the obtained timing information. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for obtaining timing information and performing a time offset adjustment for TWT operations in WLANs. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
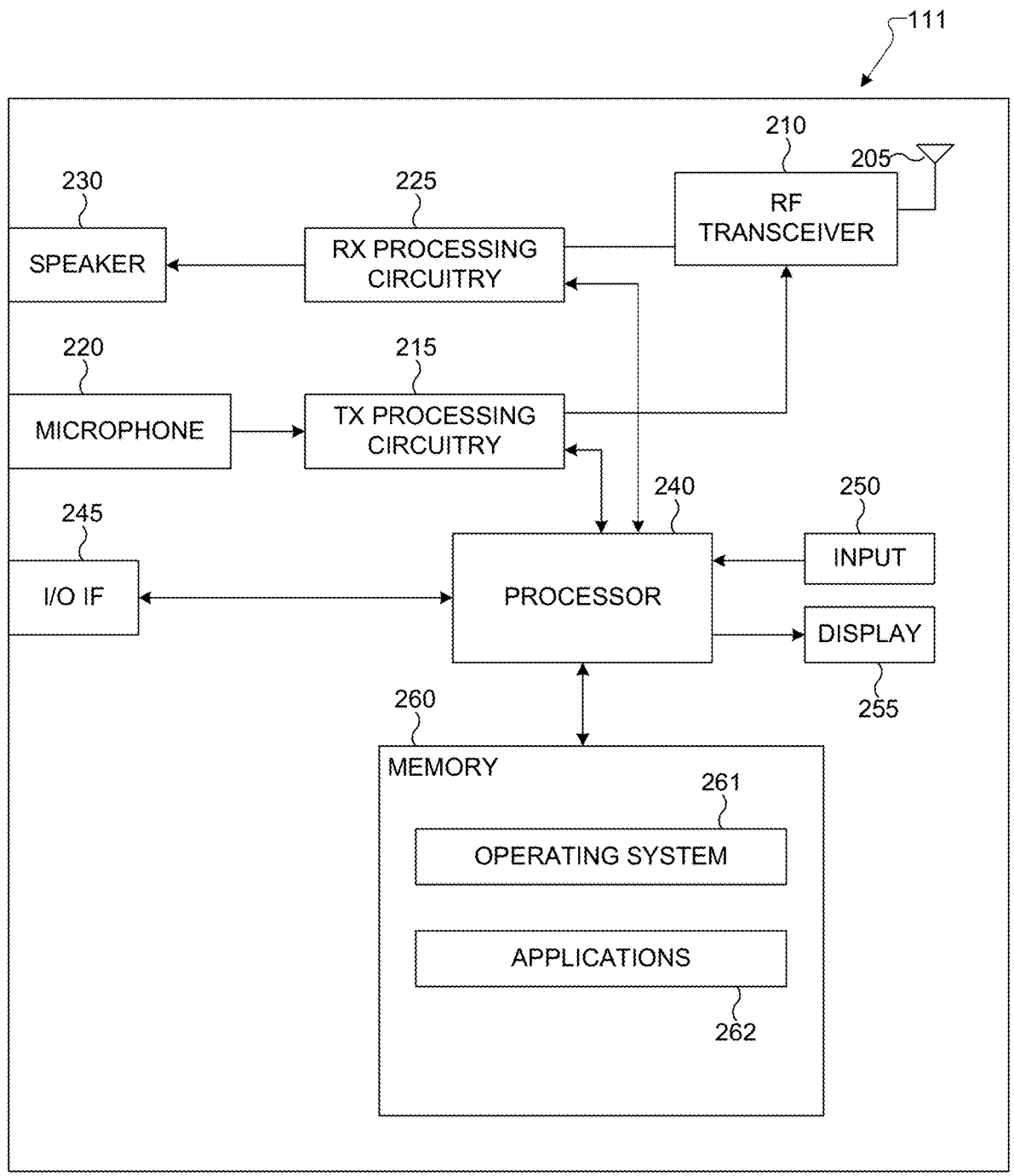
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide obtaining timing information and performing a time offset adjustment for TWT operations in WLANs. In some embodiments, the controller/processor 240 includes at least one microprocessor or microcontroller.

The controller/processor 240 is also capable of executing other processes and programs resident in the memory 260, such as operations for obtaining timing information and performing a time offset adjustment for TWT operations in WLANs. The controller/processor 240 can move data into or out of the memory 260 as required by an executing process. In some embodiments, the controller/processor 240 is configured to execute a plurality of applications 262, such as applications for generating TWT elements including a request for timing information of another STA, determine a time offset to adjust a start time of a next TWT interval based on the timing information. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
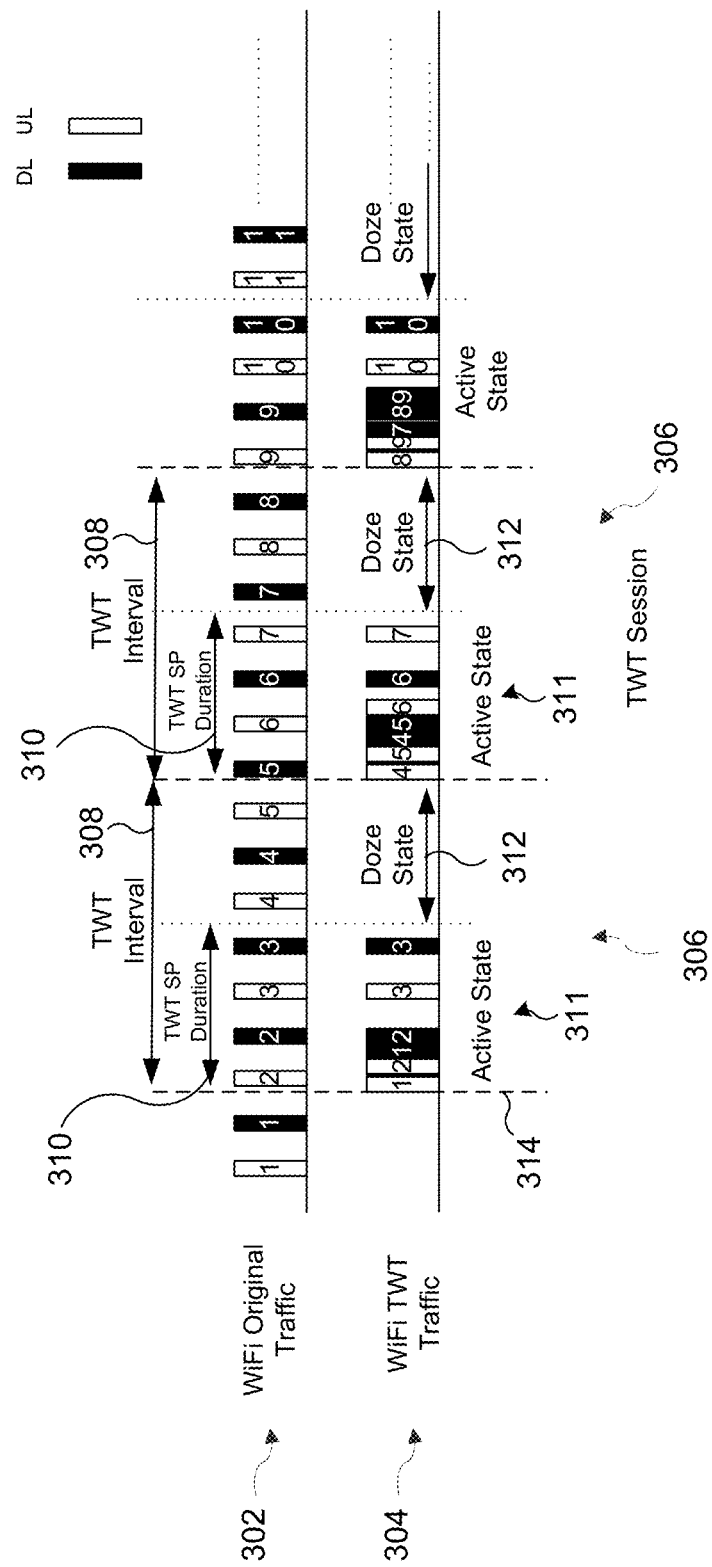
FIG. 3 illustrates a diagram of packet exchange between devices according to embodiments of the present disclosure.

FIG. 3 illustrates a diagram of packet exchange between devices according to embodiments of the present disclosure. For the purposes of this disclosure, the figures will be discussed from the point of view of a STA, which may be a STA 111, but it is understood that it could be any suitable wireless communication device.

FIG. 3 illustrates two scenarios of exchange of uplink (UL) communication packets and downlink (DL) communication packets (which may be collectively referred to as traffic) between an AP and an associated client STA. First, without wake time negotiation between the AP and the STA (e.g., as seen in the top graph 302), and second, with wake time negotiation between the AP and the STA (e.g., in an IEEE 802.11ax system and as seen in the bottom graph 304). In the top graph 302, there is a regular stream of non-buffered traffic between the AP and the STA, with UL packets being interspersed with DL packets. In this scenario (i.e., without wake time negotiation) there is no option for the STA to enter a doze state or a power save state.

By contrast, in the bottom graph 304, wake time negotiation gives rise to consecutive TWT sessions 306. Each TWT session 306 is defined as the time period from the beginning of a TWT interval 308 to the end of the TWT interval 308. Each TWT session 306 includes two states: an active state 311, defined by a TWT service period (SP) duration 310 (during which the STA is awake to communicate with the AP), and a power save state or doze state 312 (during which the STA is not actively awake or communicating with the AP). As a result of wake time negotiation, power efficiency at the STA is improved without adding too much latency or allowing UL or DL packets to be dropped.

In wake time negotiation, the negotiated TWT parameters include the wake interval (e.g., the TWT interval 308 for each TWT session 306), wake duration (e.g. the TWT SP duration 310 for each TWT session 306), and initial wake time or offset (e.g., indicated by the TWT start time 314). These negotiated parameters highly affect latency, throughput, and power efficiency, which are directly related to the QoS (quality of service) a customer experiences. Services with different traffic characteristics can have different TWT parameter configurations for better QoS. Additionally, the TWT configuration should adapt to network and service status variation.

Figure 4:
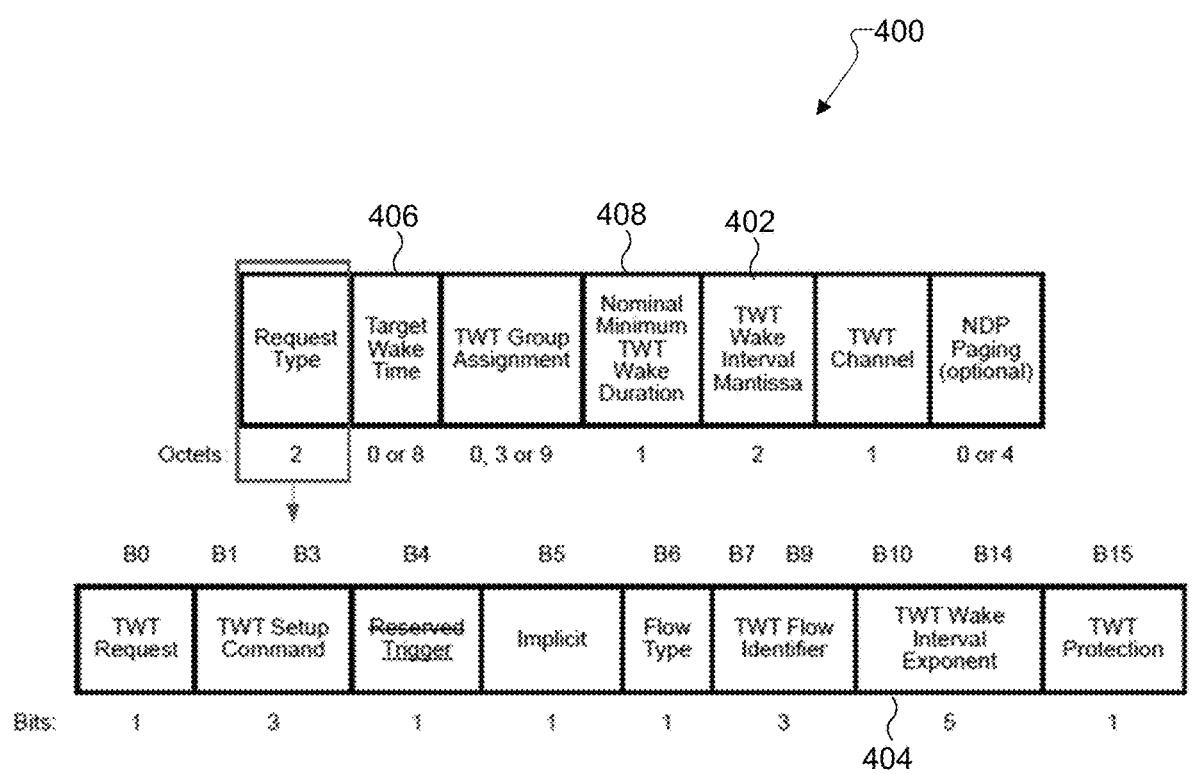
FIG. 4 illustrates an example TWT parameter set field used for TWT parameter negotiation according to embodiments of the present disclosure.

In some embodiments, a TWT parameter set field is used to negotiate the TWT parameters. FIG. 4 illustrates an example TWT parameter set field 400 used for TWT parameter negotiation according to embodiments of the present disclosure. The TWT agreement is initiated by a STA sending a TWT negotiation request to an AP. Once a TWT agreement is made between the AP and the STA, the STA periodically wakes up to communicate with the AP, where the interval between the successive wake times is jointly specified by the TWT wake interval mantissa 402 and TWT wake interval exponent 404 subfields in the TWT parameter set field 400.

The target wake time 406 and nominal minimum TWT wake duration 408 subfields specify, respectively, the first wake time for the TWT agreement, and the time for which the STA must wait before going to doze state when there is no transmitted traffic after a wake time, which is the TWT SP duration 310 in FIG. 3.

Figure 5:
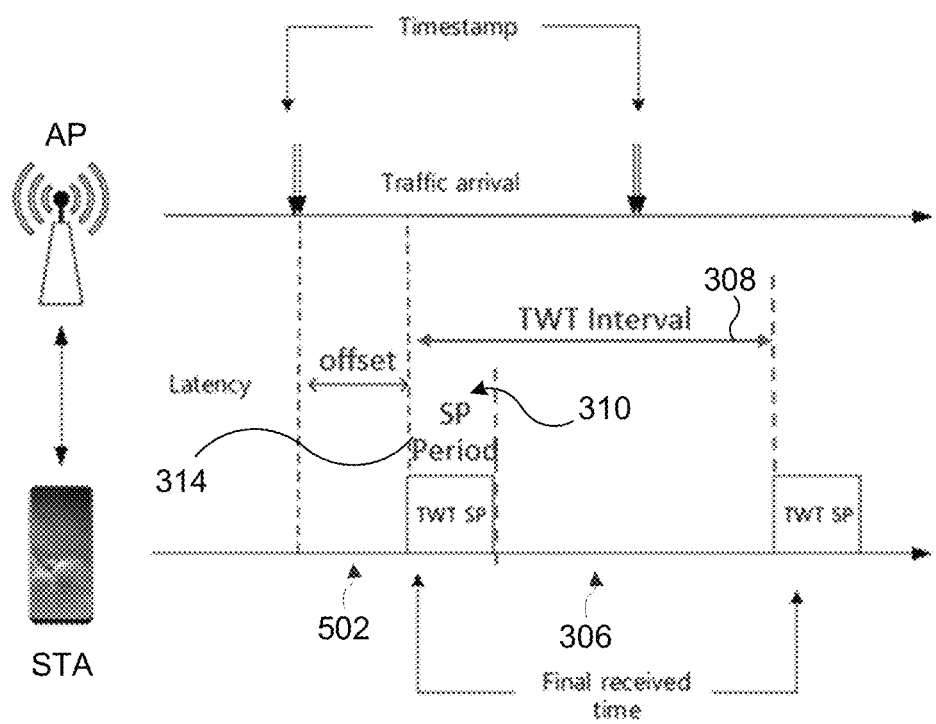
FIG. 5 illustrates an offset in a TWT session according to embodiments of the present disclosure.
Figure 6:
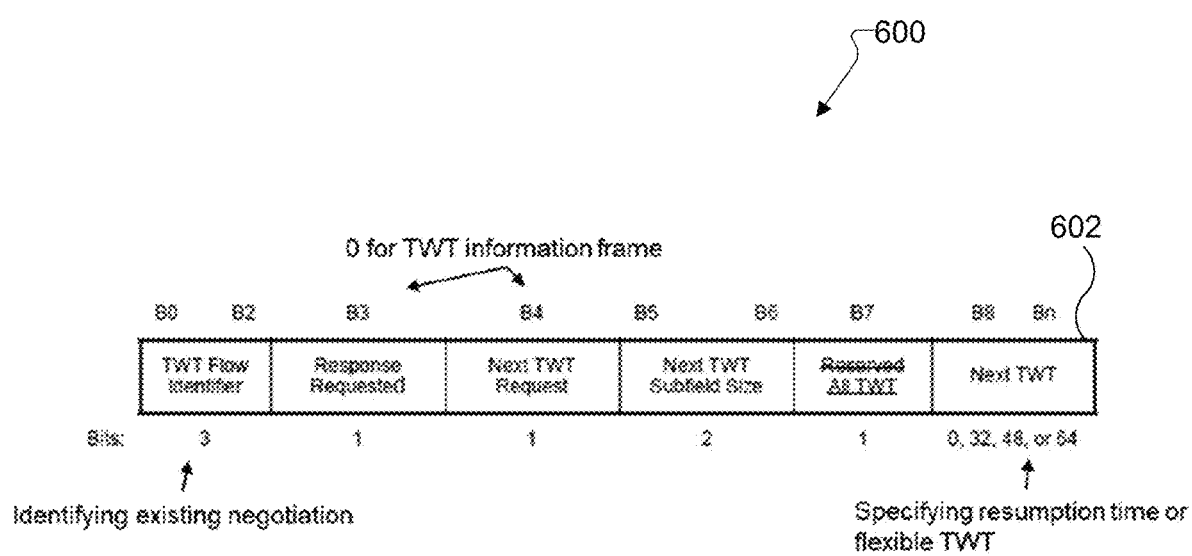
FIG. 6 illustrates an example TWT information frame according to embodiments of the present disclosure.

Other than the wake interval and wake duration, offset is also an important impact factor on the user experience, as the offset could affect the latency. FIG. 5 illustrates an offset in a TWT session according to embodiments of the present disclosure. Different offsets 502 introduce a different additional TWT related latency. TWT interval 308 and offset 502 together define the additional latency introduced by TWT. After TWT negotiation setup, the offset 502 can be adjusted by the field "Next TWT" 602 in the example TWT information frame 600 illustrated in FIG. 6.

Figure 7:
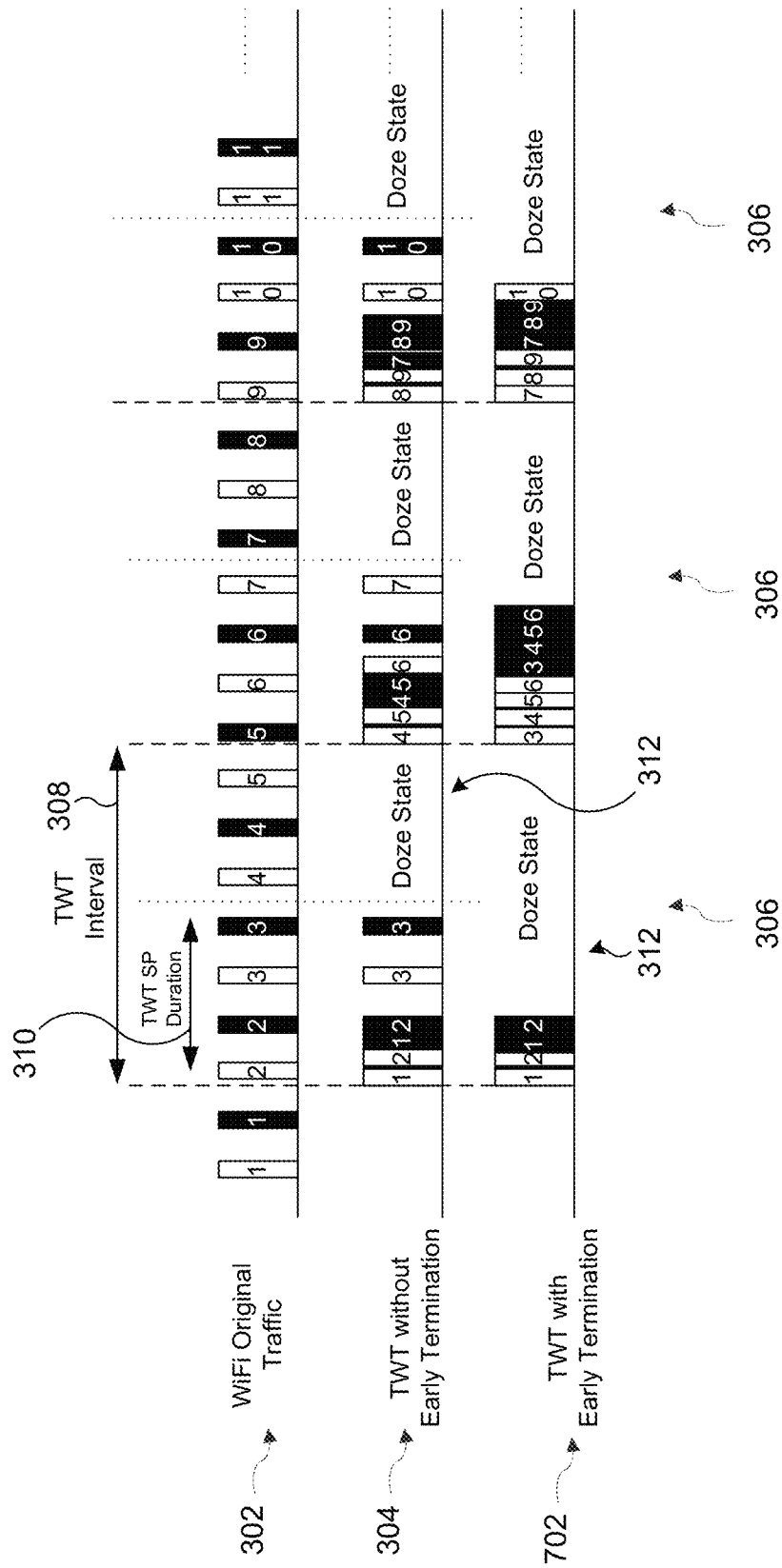
FIG. 7 illustrates an example of early termination of TWT according to embodiments of the present disclosure.

FIG. 7 illustrates an example of early termination of TWT according to embodiments of the present disclosure. In various embodiments, the actual TWT SP duration 310 is dynamically determined in run time by the aforementioned nominal minimum TWT wake duration, and the STA enters the doze state 312 when a packet is received with EOSP (end of service period) bit set to "1", or more data bit set to "0". Depending on whether or not early termination is supported, the time the STA enters the doze state 312 will be slightly different. As shown in graph 702, if the STA supports early termination then once the STA receives a packet with EOSP bit set to "1" or more data bit "0" the STA can enter doze state 312 (although there could be a slight delay between reception of the packet and entering doze state 312). If the STA does not support early termination, then it will wait until end of TWT SP duration to enter doze state 312, as shown in graph 304.

Figure 8:
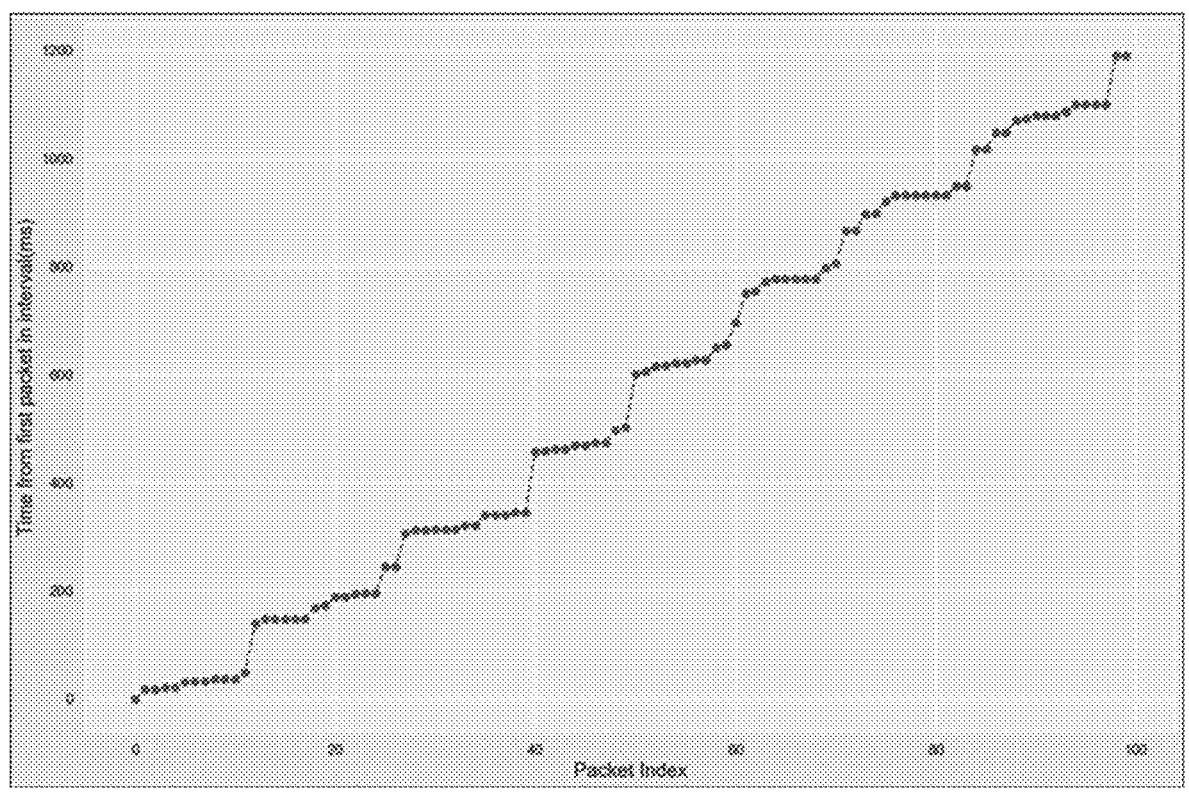
FIG. 8 illustrates an example of bursty and roughly periodic data traffic from a file downloading application according to embodiments of the present disclosure.
Figure 9:
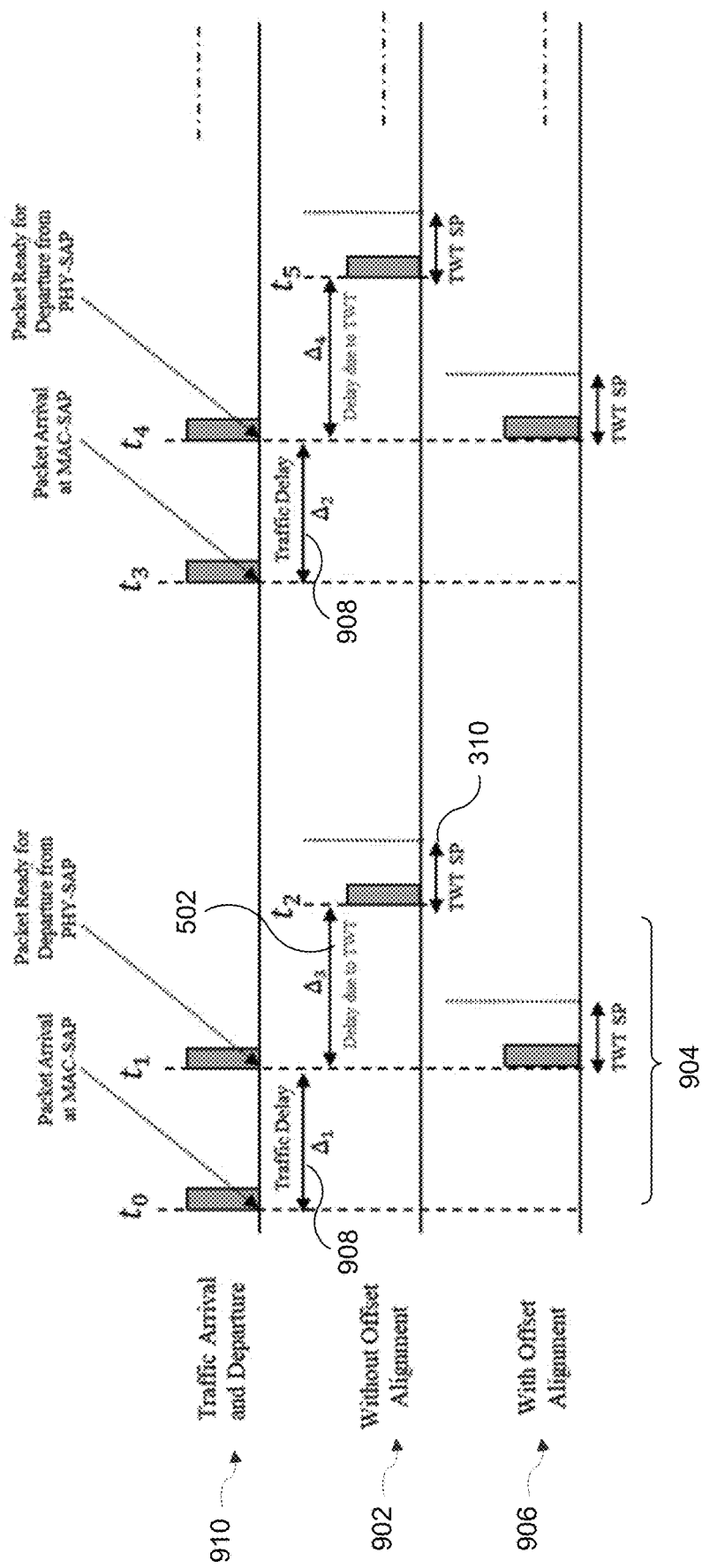
FIG. 9 illustrates an example of TWT latency with and without offset alignment according to various embodiments of the present disclosure.

In many applications, data traffic between a STA and AP is bursty and roughly periodic. FIG. 8 illustrates an example of such data traffic from a file downloading application. For the type of data shown in FIG. 8, if a TWT solution only sets up a TWT interval and TWT SP duration, it will introduce a relatively large latency. For example, FIG. 9 illustrates an example of TWT latency with and without offset alignment according to various embodiments of the present disclosure. Latency 904 (illustrated with respect to the middle graph 902 in FIG. 9) is an example of such relatively large latency. On the other hand, if the TWT solution also aligns the offset, then the extra latency introduced by TWT (i.e., the offset 502 as shown in FIG. 9) could be relatively small. For example, graph 906 in FIG. 9 illustrates offset alignment that reduces or eliminates offset 502. Timing information of the traffic is needed to align the offset. Such timing information can include information on the traffic delay 908.

Traffic delay can be defined as the duration between the time (TSF) when a packet arrives at the AP/non-AP STA (e.g., when the packet arrives at the MAC layer from a higher layer) and time (TSF) when it is successfully transmitted by the AP/non-AP STA. This delay is determined based on queuing delays at the AP/non-AP STA, contention time, delay from deferring to other STAs and number of retransmissions (e.g., due to collisions on the wireless channel). Alternatively, traffic delay can be defined as the delay between the time (TSF) of the packet arriving from higher layer and the time (TSF) of the packet being accepted by the MAC layer. Other definitions of traffic delay are also possible.

This information can be useful to STAs in many applications, including TWT timing offset alignment so that TWT operation can support latency-sensitive applications. Furthermore, knowledge of traffic delay and breakdown into its components can be useful while making a number of decisions such as channel selection, AP selection, etc. Specifically, traffic delay information can be useful in formulation of metrics to understand the degree to which the non-AP STA's downlink traffic is hindered. If the hindrance to downlink traffic is high, the non-AP STA can initiate a change in mode of operation (e.g., by switching to an alternate channel/band, switching to a different AP, etc.) thereby reducing performance degradation.

Embodiments of the present disclosure provide methods that enable traffic delay information to be requested by an AP STA or non-AP STA. Herein below, the STA that sends a traffic delay information request is referred to as a TWT Requesting STA, and the STA from which the traffic delay information is requested is referred to as a TWT Responding STA.

TWT operation allows adjustment of the alignment of the TWT SP start time using the TWT Constraint Parameters element or TWT Information frame. In 802.11, the Starting Target Wake Time Alignment field within the TWT Constraint Parameters element contains a positive integer, n, which indicates a recommended time for the start of the first TWT SP of a TWT agreement. The Target Wake Time is, therefore, recommended to be an integer multiple of (n+1). However, without knowing the traffic delay information at the TWT Responding STA side, the TWT Requesting STA cannot set (suggest) the TWT parameters appropriately.

For instance, if the TWT Requesting STA doesn't have any information about how much delay the traffic faces at the TWT Responding STA, the TWT Requesting STA, while setting up a TWT agreement, may not choose the appropriate Target Wake Time in the TWT element sent from the TWT Requesting STA to the TWT Responding STA. This may lead to large delay between the time when traffic arrives at the TWT Responding STA and the time the TWT SP starts. Without proper timing offset (between the traffic arrival and the TWT SP start time) alignment, the latency introduced by TWT operation can be relatively large, and may not satisfy the tight latency requirement of the application. With proper timing offset alignment using traffic arrival information at the TWT Requesting STA side, TWT operation can achieve low power consumption while satisfying low-latency requirements for periodic traffic. This makes it possible to apply TWT operation for applications with a very strict latency requirement. Hence, it could bring significant benefits for battery driven devices, such as augmented reality/virtual reality (AR/VR) glasses.

In the example of FIG. 9, TWT Requesting STA wants to establish a TWT agreement with the TWT Responding STA. A scenario for latency-sensitive traffic is assumed, wherein the traffic arrival at the TWT Responding STA is bursty and periodic. As shown in the top graph 910, traffic arrives at the TWT Responding STA (at the MAC layer or the MAC service access point (SAP)) at time $t_0$ (for packet 1) and time $t_3$ (for packet 2). At the TWT Responding STA, the packets face traffic (or packet) processing delay 908 (e.g., frame format, segmentation/aggregation, queueing delay, scheduling delay, etc.). Packet 1 and packet 2 become ready for departure from the TWT Responding STA at time $t_1$ and at time $t_4$, respectively. The departure point can be at the PHY SAP. The departure point can also be after PHY processing and before over-the-air transmission if the PHY layer processing delay can be estimated with sufficient accuracy. Therefore, the traffic delays 908 for the two packets are $\Delta_1=(t_1-t_0)$ and $\Delta_2=(t_4-t_3)$, respectively.

Without information on this traffic delay at the TWT Responding STA, the TWT Requesting STA cannot choose the appropriate Target Wake Time field in the TWT element, and consequently, it establishes a TWT agreement with TWT SP start time at $t_2$ and $t_5$, respectively. Accordingly, due to the misaligned TWT SP start time, this TWT agreement induces an additional latency (i.e., the offset 502) of $\Delta_3=(t_2-t_1)$ and $\Delta_4=(t_5-t_4)$, respectively. On the other hand, if the TWT Requesting STA had the information on how much traffic delay the packets incur at the TWT Responding STA side, then the TWT Requesting STA could set the Target Wake Time field appropriately so that TWT SPs now start at times $t_1$ and $t_4$, respectively, for the two packets. This would satisfy the latency requirement of the application while reducing power consumption with TWT operation.

For ease of explanation, in the embodiments below a non-AP STA and AP STA are both referred to simply as a STA. It is understood, however, that the TWT Requesting STA and TWT Responding STA can each be either a non-AP STA or an AP STA. Furthermore, in the below embodiments, a STA can indicate its capability for requesting or providing the traffic delay information. The TWT Requesting STA may request the traffic delay information from the TWT Responding STA during the TWT setup process.

In some embodiments, if the TWT Requesting STA intends to request traffic delay information from the TWT Responding STA for all Traffic Identifiers (TIDs), this traffic delay information request may be indicated by including an indication bit in the TWT element transmitted from the TWT Requesting STA to the TWT Responding STA. This is shown in the example of FIG. 10, which illustrates an example Control field format 1000 of a TWT element according to embodiments of the present disclosure.

Figure 10:
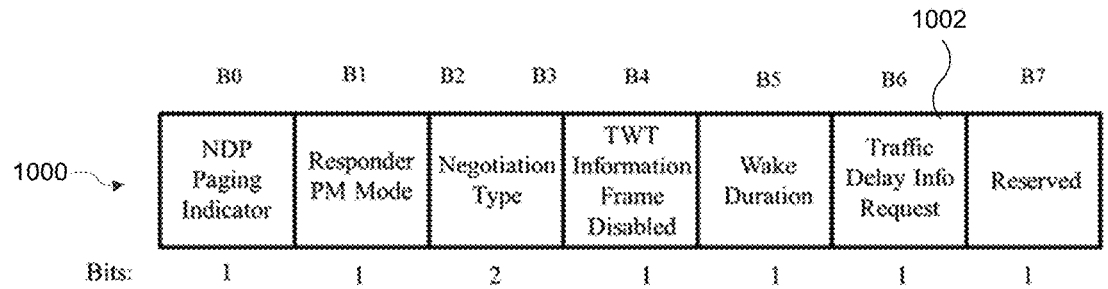
FIG. 10 illustrates an example Control field format of a TWT element according to various embodiments of the present disclosure.

In FIG. 10, the traffic delay information request for all TIDs is indicated by the TWT Requesting STA by including the "Traffic Delay Info Request" subfield 1002 in the Control field of the TWT element. If the bit corresponding to the Traffic Delay Info Request subfield 1002 is set to zero, it indicates that no traffic delay information is requested by the TWT Requesting STA from the TWT Responding STA. On the other hand, if the bit corresponding to the Traffic Delay Info Request subfield 1002 is set to 1, it would indicate that the TWT Requesting STA is seeking traffic delay information from the TWT Responding STA. In the example of FIG. 10, Bit 6 (B6) is used to indicate the Traffic Delay Info Request. In another embodiment, Bit 7 (B7) can also be used to indicate the Traffic Delay Info Request.

In some embodiments, a TWT Requesting STA may request traffic delay information from the TWT Responding STA for some selected TIDs only. A TID bitmap can be used by the TWT Requesting STA to indicate the TIDs for which traffic delay information is requested. This is shown in the example of FIG. 11A, which illustrates another example Control field format 1100 and an example Individual TWT Parameter Set field format 1101 of a TWT element.

Figure 11A:
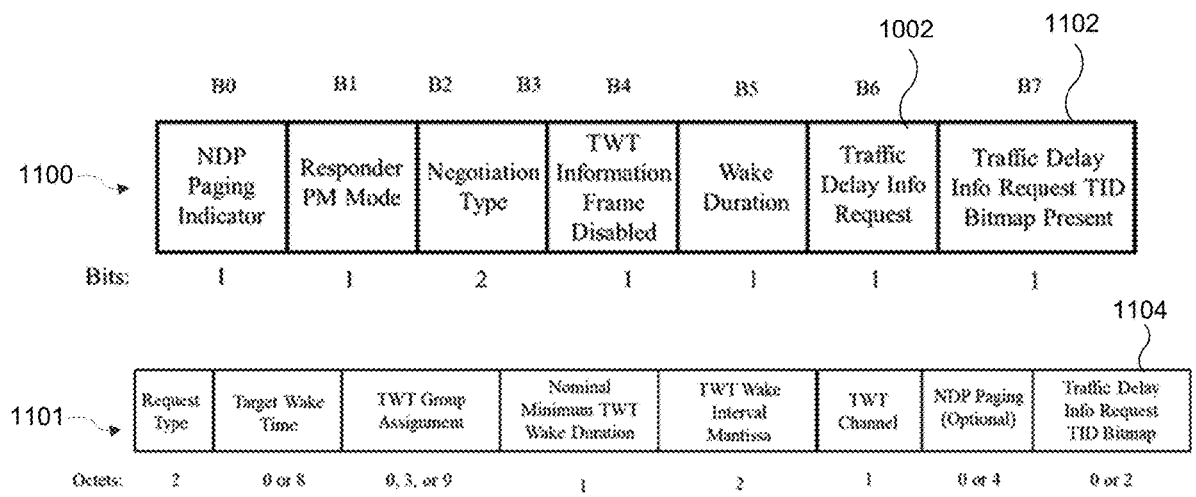
FIG. 11A illustrates another example Control field format and an example Individual TWT Parameter Set field format of a TWT element according to various embodiments of the present disclosure.
Figure 11B:
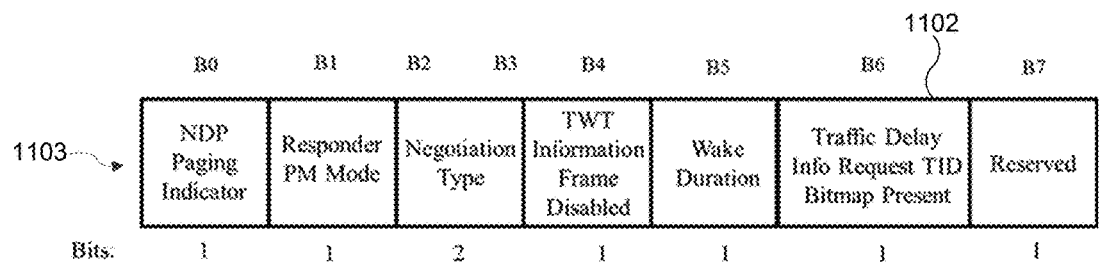
FIG. 11B illustrates another example Control field format of a TWT element according to various embodiments of the present disclosure.

In FIG. 11A, the "Traffic Delay Info Request TID Bitmap Present" subfield 1102 in the Control field of the TWT element may indicate the presence of such a TID bitmap for which traffic information is requested by the TWT Requesting STA. If the Traffic Delay Info Request TID Bitmap Present subfield 1102 in the Control field of the TWT element is set to 1, it indicates that a TID bitmap is present in the TWT element to indicate the TIDs for which traffic delay information is requested, and in this case, a "Traffic Delay Info Request TID Bitmap" subfield 1104 in the Individual TWT Parameter Set field 1101 contains the corresponding TID bitmap. If the bit corresponding to the k-th position in the Traffic Delay Info Request TID Bitmap subfield 1104 is set to 1, it indicates that traffic delay information is requested for the k-th TID. If the bit is set to 0, it indicates that traffic delay information is not requested for the k-th TID. In some embodiments, when the Traffic Delay Info Request subfield 1002 and the Traffic Delay Info Request TID Bitmap Present subfield 1102 both are present in the Control field of the TWT element (e.g., in the example Control field format 1100), the Traffic Delay Info Request subfield 1002 is ignored.

In the example of FIG. 11A, the Traffic Delay Info Request TID Bitmap Present subfield 1102 is indicated by bit 7 (B7) of the Control field of the TWT element. In this case, the Traffic Delay Info Request subfield 1002 would be indicated by bit 6 (B6) of the Control field of the TWT element. In other embodiments, the Traffic Delay Info Request TID Bitmap Present subfield 1102 may be indicated by bit 6 (B6) of the Control field of the TWT element. In this case, the Traffic Delay Info Request subfield 1002 would be indicated by bit 7 (B7) of the Control field of the TWT element.

In some embodiments, even when the Traffic Delay Info Request subfield is not present in the Control field of the TWT element, the Traffic Delay Info Request TID Bitmap Present subfield can be present in the Control field of the TWT element (indicated by either bit 6 or bit 7 of the Control field), and will accordingly indicate the presence of the Traffic Delay Info Request TID Bitmap subfield in the Individual TWT Parameter Set field. This is shown in the example Control field format 1103 of FIG. 11B, wherein the Traffic Delay Info Request TID Bitmap Present subfield 1102 is present without the Traffic Delay Info Request subfield 1002.

In some embodiments, upon receiving the traffic delay information request from the TWT Requesting STA (e.g., when Traffic Delay Info Request=1 in the received TWT element), the TWT Responding STA shall provide the requested traffic delay information to the TWT Requesting STA. That is, the TWT Responding STA shall provide the traffic delay information for all TIDs to the TWT Requesting STA.

In other embodiments, upon receiving the traffic delay information request from the TWT Requesting STA (e.g., when Traffic Delay Info Request=1 in the received TWT element), the TWT Responding STA may decide whether or not to accept the traffic delay information request received from the TWT Requesting STA.

In some such embodiments, the TWT Responding STA may indicate the acceptance or rejection of the TWT traffic delay information request—using the same Control field format of the TWT element as the TWT Requesting STA—via the indication bit corresponding to the Traffic Delay Info Request subfield. For example, using the Control field format 1000 of FIG. 10, Traffic Delay Info Request=0 in the TWT element sent from the TWT Responding STA would indicate the rejection of the traffic delay information request from the TWT Requesting STA for all requested TIDs. Conversely, Traffic Delay Info Request=1 in the TWT element sent from the TWT Responding STA would indicate the acceptance of the traffic delay information request from the TWT Requesting STA for all requested TIDs.

In other embodiments, the TWT Responding STA may indicate the acceptance or rejection of the TWT traffic delay information request by including an "Accept Traffic Delay Info Request" subfield in the control field of the TWT element sent from the TWT Responding STA. This is illustrated in the example Control field format 1200 of FIG. 12, which includes an Accept Traffic Delay Info Request subfield 1202. For example, Accept Traffic Delay Info Request=0 in the TWT element sent from the TWT Responding STA would indicate the rejection of the traffic delay information request from the TWT Requesting STA for all requested TIDs. Accept Traffic Delay Info Request=1 in the TWT element sent from the TWT Responding STA would indicate the acceptance of the traffic delay information request from the TWT Requesting STA for all requested TIDs.

Figure 12:
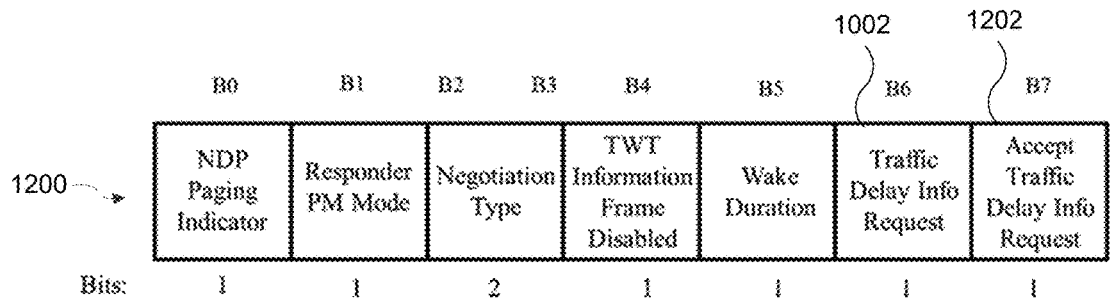
FIG. 12 illustrates another example Control field format of a TWT element according to various embodiments of the present disclosure.

In the example of FIG. 12, the Traffic Delay Info Request subfield 1002 is indicated by Bit 6 (B6) of the Control field of the TWT element, and the Accept Traffic Delay Info Request subfield 1202 is indicated by Bit 7 (B7) of the Control field of the TWT element. In other embodiments, the Traffic Delay Info Request subfield can be indicated by Bit 7 (B7) of the Control field of the TWT element, and the Accept Traffic Delay Info Request subfield can be indicated by Bit 6 (B6) of the Control field of the TWT element. In these embodiments (i.e., when the Accept Traffic Delay Info Request subfield is present), if the TWT element is sent by a TWT Requesting STA, then the Accept Traffic Delay Info Request subfield 1202 is ignored. If the TWT element is sent by a TWT Responding STA, then the Traffic Delay Info Request subfield 1002 is ignored.

In some embodiments in which the TWT Responding STA may decide whether or not to accept the traffic delay information request received from the TWT Requesting STA, the TWT Responding STA may accept the traffic delay information request for only a subset of requested TIDs. The accepted TIDs may be indicated by a TID bitmap included in the TWT element sent from the TWT Responding STA. This is shown in FIG. 13, which illustrates another example Control field format 1300 of a TWT element.

Figure 13:
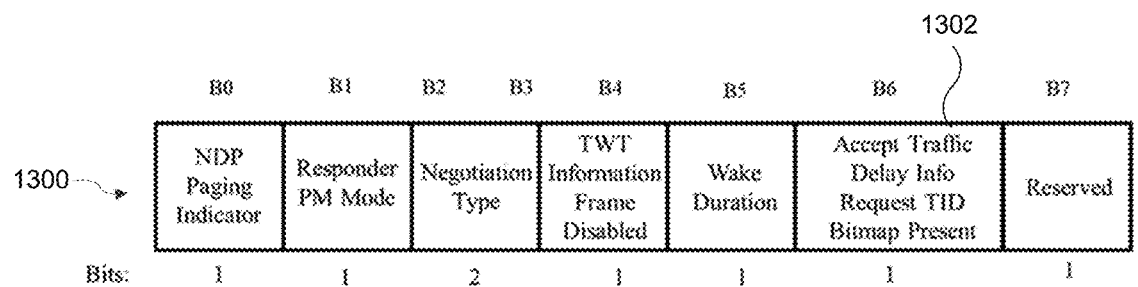
FIG. 13 illustrates another example Control field format of a TWT element according to various embodiments of the present disclosure.

In FIG. 13, the "Accept Traffic Delay Info Request TID Bitmap Present" subfield 1302 in the Control field of the TWT element may indicate the presence of such a TID bitmap for which the traffic delay information request is accepted by the TWT Responding STA. If the Accept Traffic Delay Info Request TID Bitmap Present subfield 1302 is set to 1 in the Control field of the TWT element, it indicates that an "Accept Traffic Delay Info Request TID Bitmap" subfield is included in the Individual TWT Parameter Set field of the TWT element in order to indicate the TIDs for which the traffic delay information request has been accepted. If the bit corresponding to the k-th position in the Accept Traffic Delay Info Request TID Bitmap subfield is set to 1, it indicates that the traffic delay information request is accepted for the k-th TID. If the bit is set to 0, it indicates that the traffic delay information request is not accepted for the k-th TID.

The Accept Traffic Delay Info Request TID Bitmap Present subfield can be indicated by either bit 6 (B6) or bit 7 (B7) of the Control field of the TWT element. In some embodiments, the Accept Traffic Delay Info Request TID Bitmap Present subfield 1302 and the Accept Traffic Delay Info Request subfield 1202 both are present in the Control field of the TWT element. In some such embodiments, the Accept Traffic Delay Info Request subfield 1202 is ignored.

In some embodiments, if the TWT Responding STA accepts the traffic delay information request from the TWT Requesting STA according to one of the above embodiments, the TWT Responding STA may provide the traffic delay information to the TWT Requesting STA by sending a "Traffic Delay Information" element in the TWT Setup frame or any other frame sent to the TWT Requesting STA. The Traffic Delay Information element would contain the necessary traffic delay information so that the TWT Requesting STA can adjust the TWT parameters at run-time to minimize the latency.

Figure 14:
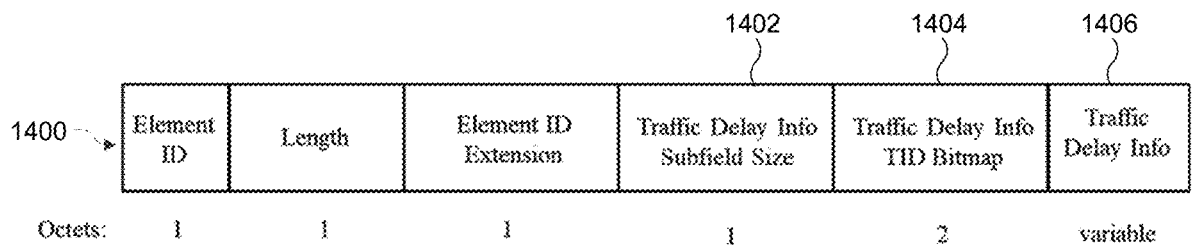
FIG. 14 illustrates an example Traffic Delay Information element according to embodiments of the present disclosure.

FIG. 14 illustrates an example Traffic Delay Information element 1400 according to these embodiments. In the example of FIG. 14, a "Traffic Delay Info Subfield Size" subfield 1402 determines the size of the Traffic Delay Info subfield. A "Traffic Delay Info TID Bitmap" subfield 1404 contains the bitmap for TIDs for which traffic delay information is included in the Traffic Delay Information element. If the bit corresponding to the k-th position in the Traffic Delay Info TID Bitmap subfield 1404 is set to 1, it indicates that traffic delay information for the k-th TID is included in the Traffic Delay Information element 1400. If the bit is set to 0, it indicates that traffic delay information is not included for the k-th TID. A "Traffic Delay Info" subfield 1406 contains the traffic delay information for different TIDs. For each TID, there can be two (any other number is also possible) octets for traffic delay information. In the Traffic Delay Info subfield 1406, octets for traffic delay information for different TIDs are cascaded.

The TIDs for which traffic delay information are included in the Traffic Delay Info subfield 1406 are indicated by the TID bitmap in the Traffic Delay Info TID Bitmap subfield 1404. For example, if the TID bitmap in the Traffic Delay Info TID Bitmap subfield 1404 is [0 1 1 0 0 1 0 0 0 0 0 0 0 0], it would indicate that the Traffic Delay Info subfield 1406 will contain traffic delay information for 3 TIDs (corresponding to 3 ones in the TID bitmap). If two octets are used for representing traffic delay information for each TID, then the Traffic Delay Info subfield 1406 would be 6 octets long, in this example. The first two octets in the Traffic Delay Info subfield 1406 would contain the traffic delay information corresponding to TID 2, the second two octets in the Traffic Delay Info subfield 1406 would contain the traffic delay information corresponding to TID 3, and the final two octets in the Traffic Delay Info subfield 1406 would contain the traffic delay information corresponding to TID 6.

In another embodiment, the Traffic Delay Info Subfield Size subfield 1402 may not be present in the Traffic Delay Information element 1400. In that case, the size of the Traffic Delay Info subfield 1406 can be determined based on the number of ones in the Traffic Delay Info TID Bitmap and the number of octets used to encapsulate the traffic delay information per TID. For example, if the TID bitmap in the Traffic Delay Info TID Bitmap subfield 1404 is [0 1 1 0 0 1 1 0 0 0 0 0 0 0 0 0] and 2 octets are used to represent traffic delay information for each TID, then the size of the Traffic Delay Info subfield 1406 is 8 octets.

In some other embodiments in which the TWT Responding STA accepts the traffic delay information request from the TWT Requesting STA, in order to provide the traffic delay information to the TWT Requesting STA, the TWT Responding STA may send a Traffic Delay Information control frame. This Traffic Delay Information control frame would contain the necessary traffic delay related information for the TWT Requesting STA.

Figure 15:
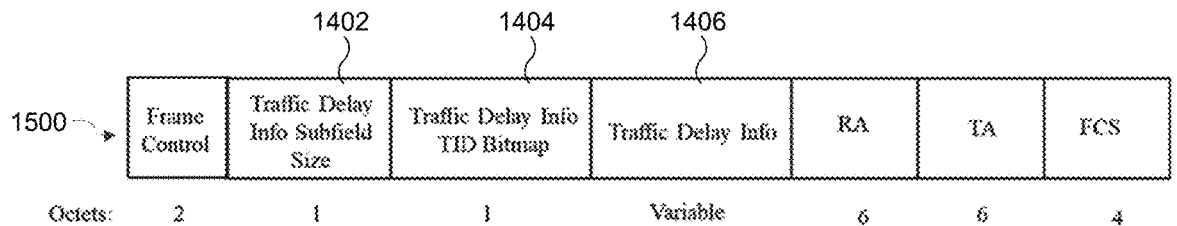
FIG. 15 illustrates an example Traffic Delay Information control frame according to embodiments of the present disclosure.

FIG. 15 illustrates an example Traffic Delay Information control frame 1500 according to these embodiments. In the example of FIG. 15, the Traffic Delay Info Subfield Size subfield 1402, Traffic Delay Info TID Bitmap subfield 1404, and Traffic Delay Info subfield 1406 in the Traffic Delay Information control frame 1500 can be the same as described above for the Traffic Delay Information element 1400 of FIG. 14.

Figure 16:
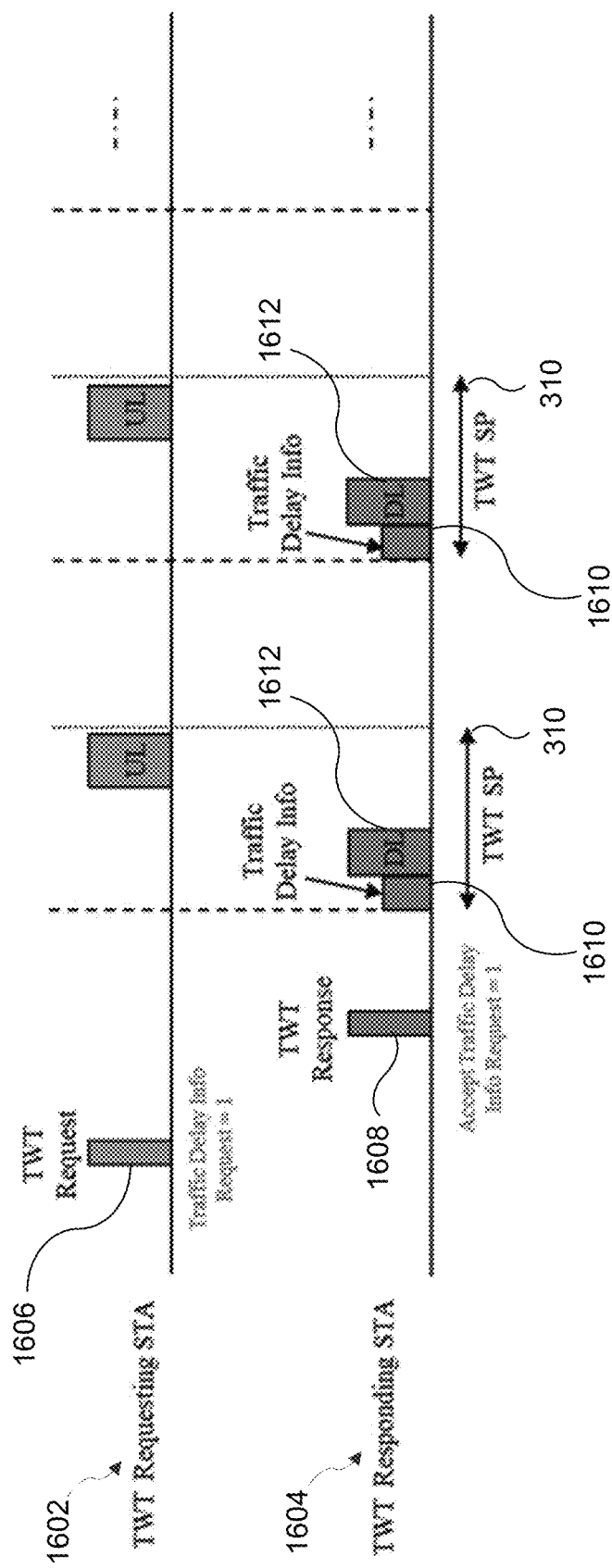
FIG. 16 illustrates an example exchange of a TWT request and TWT response according to various embodiments of the present disclosure.

FIG. 16 illustrates an example exchange of a TWT request and TWT response according to various embodiments of the present disclosure. In FIG. 16, a TWT Requesting STA 1602 sends a TWT Request 1606 to a TWT Responding STA 1604. In the control field of the TWT element sent by the TWT Requesting STA 1602, the Traffic Delay Info Request subfield is set to 1, which indicates that the TWT Requesting STA 1602 is seeking the traffic delay information at the TWT Responding STA-side for all TIDs. In response to the TWT Request 1606, the TWT Responding STA 1604 sends a TWT Response 1608 and sets Accept Traffic Delay Info Request=1 in the control field of the TWT element. A successful TWT agreement is established. At the beginning of each TWT SP 310, the TWT Responding STA 1604 provides the traffic delay information 1610 to the TWT Requesting STA 1602 before DL data 1612 is transmitted.

In some embodiments involving MLO systems, a traffic delay information request can be made between an AP MLD and a non-AP MLD. A TWT Requesting STA affiliated with a non-AP MLD can request traffic delay information from a TWT Responding STA affiliated with an AP MLD, or vice versa. The request can be made over one setup link (i.e., a link that has been set up for multi-link operation) between the AP MLD and the non-AP MLD for traffic delay information of multiple setup links between the AP MLD and the non-AP MLD.

The one setup link over which the traffic delay request is made may be referred to as a "negotiating link." In such embodiments, the TWT Requesting STA affiliated with an MLD may request the traffic delay information from the TWT Responding STA associated with a corresponding MLD during the TWT setup process on the negotiating link.

Accordingly, similar the above non-MLO embodiments, the TWT Requesting STA affiliated with an MLD sends a TWT element over the negotiating link to the TWT Responding STA associated with a corresponding MLD as part of the TWT setup process.

In some embodiments, when a TWT Requesting STA affiliated with an MLD includes Traffic Delay Info Request=1 in the TWT element sent over the negotiating link between the AP MLD and the non-AP MLD, it implies that the TWT Requesting STA is requesting traffic delay information for all setup links between the AP MLD and the non-AP MLD.

In other embodiments, the TWT Requesting STA affiliated with an MLD may indicate a subset of setup links between the AP MLD and the non-AP MLD for which it is requesting the traffic delay information. The TWT Requesting STA may include a link ID bitmap in the TWT element to indicate the subset of links for which the traffic delay information is requested. This is shown in the example of FIG. 17, which illustrates an example Control field format 1700 of a TWT element and an example Individual TWT Parameter Set field 1701 of the TWT element.

Figure 17:
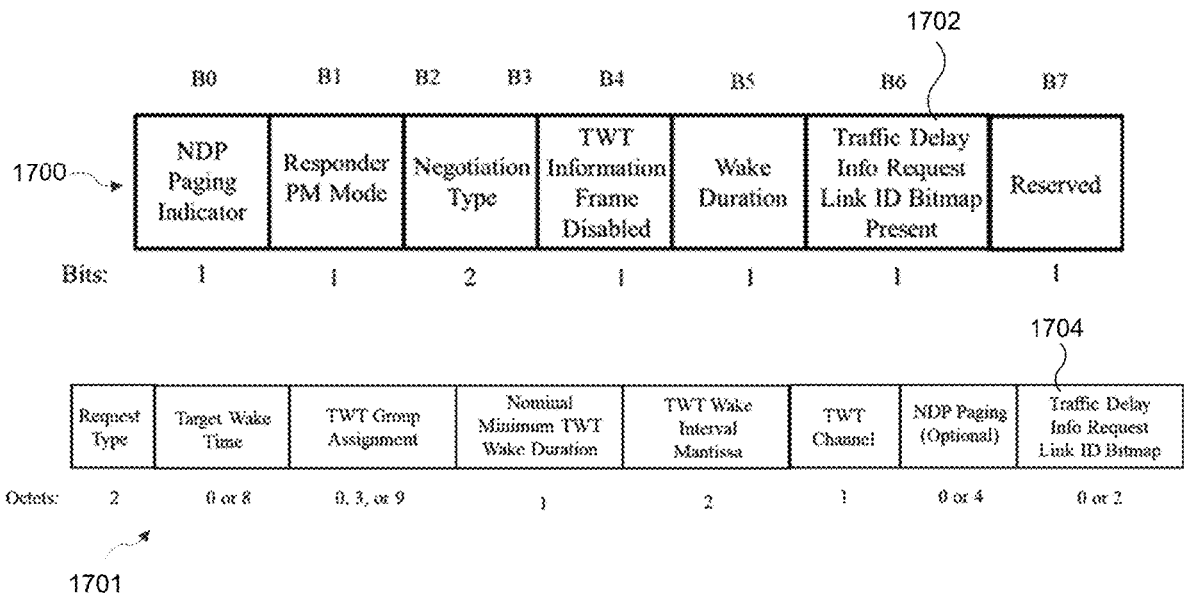
FIG. 17 illustrates an example Control field format and an example Individual TWT Parameter Set field of a TWT element according to various embodiments of the present disclosure.

In the example of FIG. 17, a "Traffic Delay Info Request Link ID Bitmap Present" subfield 1702 in the Control field of the TWT element may indicate the presence of such a link ID Bitmap in the TWT element. If the Traffic Delay Info Request Link ID Bitmap Present subfield is set to 1, it indicates that a link ID bitmap for traffic delay information request is present in the TWT element, otherwise, such a link ID bitmap is not present in the TWT element. In one embodiment, if the Traffic Delay Info Request Link ID Bitmap Present subfield 1702 is set to 1 in the TWT element sent by the TWT Requesting STA affiliated with an MLD, then a link ID bitmap is present in the Individual TWT Parameter Set field 1701 of the TWT element. A "Traffic Delay Info Request Link ID Bitmap" field 1704 in the Individual TWT Parameter Set field 1701 holds a link ID bitmap to indicate the subset of links between the AP MLD and the non-AP MLD for which the affiliated TWT Requesting STA is requesting traffic delay information. If a bit in the link ID bitmap corresponding to a link is set to 1, it indicates that traffic delay information is requested for that link, otherwise, it is not requested for that link.

In some embodiments, upon receiving a traffic delay information request from a TWT Requesting STA affiliated with an MLD for a subset of setup links between the AP MLD and the non-AP MLD, the TWT Responding STA associated with the corresponding MLD sends traffic delay information (through either a TWT Traffic Delay Info IE or a TWT Traffic Delay Info Control field, as described above, or through any other appropriate message) on each requested setup link.

In other embodiments, upon receiving a traffic delay information request from a TWT Requesting STA affiliated with an MLD for a subset of setup links between the AP MLD and the non-AP MLD, the TWT Responding STA affiliated with the corresponding MLD may indicate, in the TWT element sent from the TWT Responding STA over the negotiating link, the acceptance or rejection of the traffic delay information request for some or all links for which traffic delay information is requested. A link ID bitmap can indicate a subset of links for which the request for traffic delay information is accepted. This is shown in the example of FIG. 18, which illustrates an example Control field format 1800 and an example Individual TWT Parameter Set field 1801 of a TWT element.

Figure 18:
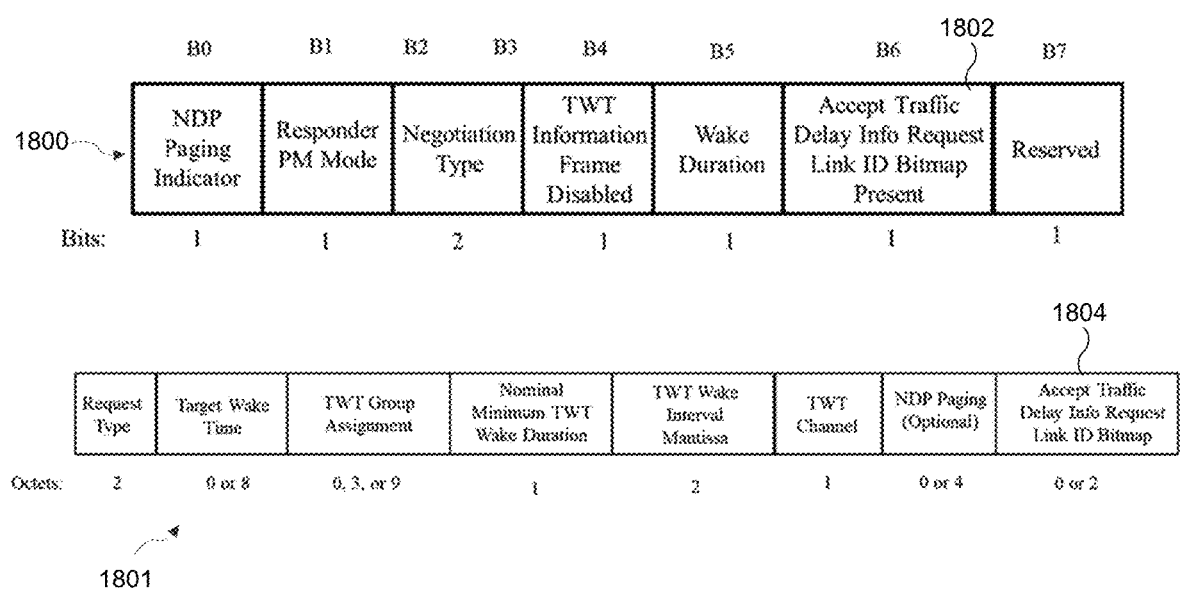
FIG. 18 illustrates another example Control field format and another example Individual TWT Parameter Set field of a TWT element according to various embodiments of the present disclosure.

In the example of FIG. 18, an "Accept Traffic Delay Info Request Link ID Bitmap Present" subfield 1802 in the Control field of the TWT element indicates whether or not a link ID bitmap is present to indicate the subset of links for which the traffic delay information request is accepted. If the Accept Traffic Delay Info Request Link ID Bitmap Present subfield 1802 is set to 1, it indicates that the link ID bitmap is present in the TWT element, otherwise the link ID bitmap is not present in the TWT element. In one embodiment, if the Accept Traffic Delay Info Request Link ID Bitmap Present subfield 1802 is set to 1 in the TWT element sent by the TWT Responding STA affiliated with an MLD, then an "Accept Traffic Delay Info Request Link ID Bitmap" field 1804 is present in the Individual TWT Parameter Set field 1801, and holds a link ID bitmap to indicate the subset of links between the AP MLD and the non-AP MLD for which the traffic delay information request is accepted. If a bit in the link ID bitmap corresponding to a link is set to 1, it indicates that the traffic delay information request is accepted for that link, otherwise, it is not accepted for that link.

Figure 19:
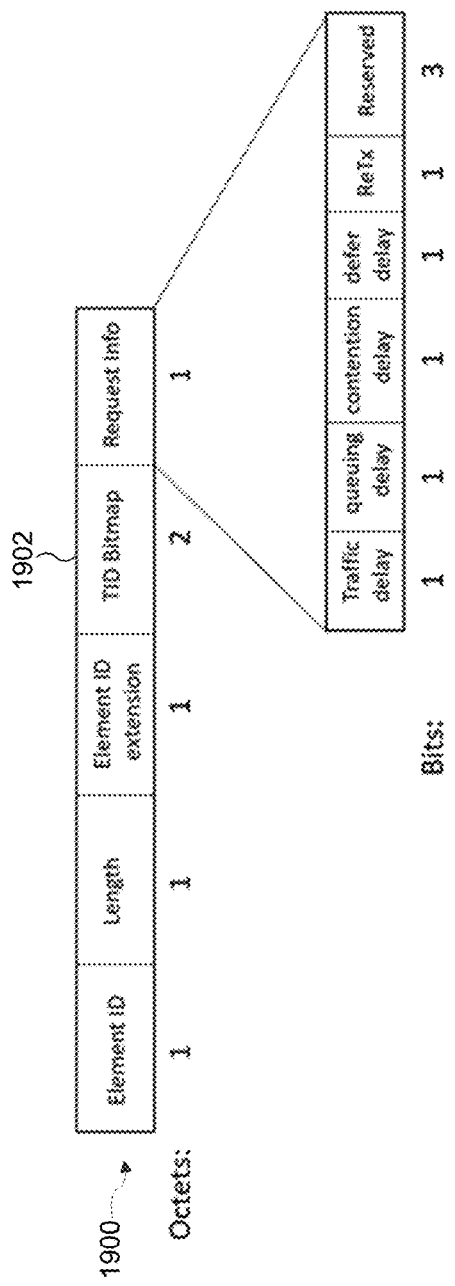
FIG. 19 illustrates an example Comprehensive Traffic Delay Request IE according to various embodiments of the present disclosure.

As an extension of the above embodiments, comprehensive traffic delay information can be requested by a non-AP STA or a STA affiliated with a non-AP MLD. Comprehensive traffic delay information can carry information on queueing delay, contention delay, defer delay, and receiver/transmitter (Rx/Tx) delay. The comprehensive traffic delay information can be requested by sending a request information element (IE) to the corresponding AP STA or STA affiliated with an AP MLD. FIG. 19 illustrates an example Comprehensive Traffic Delay Request IE 1900 according to such embodiments. In the example of FIG. 19, the non-AP STA can request comprehensive traffic delay information for only certain TIDs by indicating them in the TID Bitmap subfield 1902.

Figure 20:
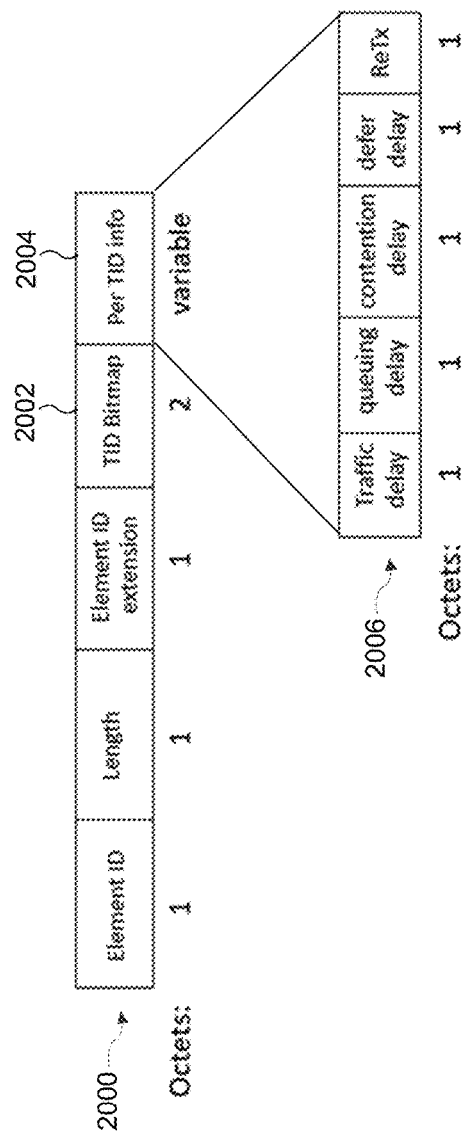
FIG. 20 illustrates an example Traffic Delay Response IE according to various embodiments of the present disclosure.

In some embodiments, the AP STA can send the requested comprehensive traffic delay information to the non-AP STA in a response frame in a Traffic Delay Response IE as illustrated in the example of FIG. 20. In the example of FIG. 20, the AP STA can include a TID Bitmap subfield 2002 to hold a TID bitmap that indicates which TIDs the information in the Per TID Info field 2004 corresponds to. For each of the TIDs indicated in the TID bitmap, the corresponding comprehensive traffic delay information can be included in the Per TID Info field 2004 using the format 2006. The comprehensive traffic delay information for each TID in the Per TID Info field 2004 can be included in the same order in which the TIDs are marked in the TID bitmap.

In the various embodiments discussed above, the request and response frames can be applied in a straightforward manner to request traffic delay information for the uplink as well. In some embodiments, the request and response IEs can be sent as independent frames. In other embodiments, the request and response IEs can be included as subfields in any of the request and response frames in the 802.11 standard. FIG. 21 illustrates an example of inclusion of traffic delay information request and response IEs in the SCS request and response framework of the 802.11 standard according to various embodiments of the present disclosure. As shown, the traffic delay information request IE 2102 can be included in the SCS descriptor element of the SCS request frame. The traffic delay information request IE can be used by the TWT Responding AP or non-AP STA (if the request corresponds to information for uplink traffic) to generate a traffic delay information response IE and include it in the SCS descriptor element of the SCS response frame in a similar manner.

Figure 22:
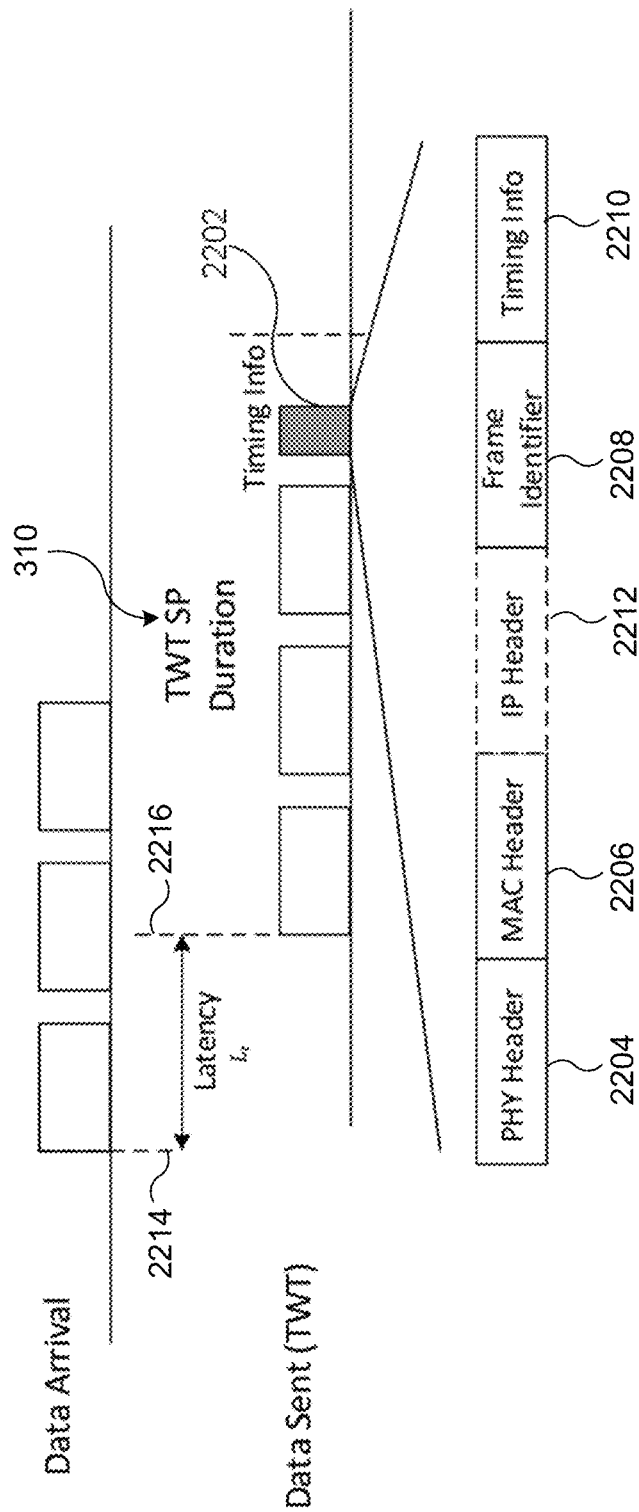
FIG. 22 illustrates data arrival and data transmission at a TWT Responding STA, including an example of a dedicated frame for sending timing information from a TWT Responding STA to a TWT Requesting STA, according to various embodiments of the present disclosure.

In the various embodiments discussed above, the traffic delay information can be sent by the TWT Responding STA in a dedicated frame. FIG. 22 illustrates data arrival and data transmission at a TWT Responding STA, including an example of a dedicated frame for sending timing information from a TWT Responding STA to a TWT Requesting STA, according to various embodiments of the present disclosure. In the example of FIG. 22, the timing information frame 2202 is a dedicated frame for sending the timing information (e.g., traffic delay information).

Depending on the layer processing the timing information, the timing information frame could be MAC frame or IP frame. If the frame is processed at the MAC layer, then it can include a PHY layer header 2204, a MAC layer header 2206, a frame identifier 2208 and the timing information field 2210. If the frame is processed in the IP layer, then it will add an IP header 2212 after the MAC header 2206. Here, frame identifier 2208 is used to identify this timing information frame 2202. In addition, the timing information field 2210 includes the timing information. One of the timing information formats can be the timing difference between the data arrival time 2214 (downlink data arriving at AP) and data transmission time 2216 (downlink data transmitted from AP to STA) for the first data packet in the SP, shown as $L_t$ in FIG. 22. This timing information format can correspond to the timing delay information discussed above.

Note that only the packet from the TWT Responding STA to the TWT Requesting STA is counted in the case of the TWT Requesting STA adjusting the offset, because the timing information from TWT Requesting STA to TWT Responding STA is already known to the TWT Requesting STA. A second timing information format can be the average $L_t$ over the last N SPs. Additionally, the timing information frame 2202 could be transmitted as the first packet of each SP or the last packet of each SP or the middle packet of each SP, in other embodiments.

Figure 23:
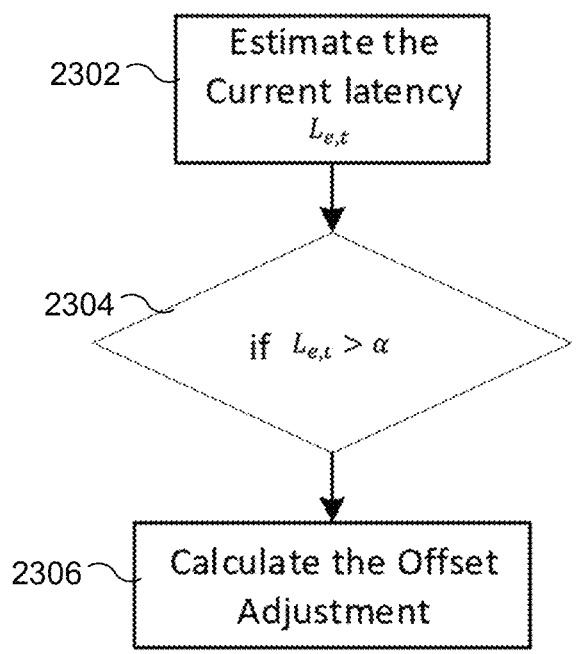
FIG. 23 illustrates an example process flow for determining the TWT offset adjustment according to various embodiments of the present disclosure.

After obtaining the timing information, the TWT Requesting STA makes uses of $L_t$ to determine the TWT offset adjustment $A_t$ (the time offset to adjust the start time of the next TWT interval). FIG. 23 illustrates an example process flow for determining the TWT offset adjustment according to various embodiments of the present disclosure. The first step 2302 is to estimate the current latency $L_{e,t}$ based on $L_t$. At step 2304, if the estimated latency $L_{e,t} > \alpha$, where $\alpha$ is a configurable variable which indicates the level of error tolerance (e.g., a=2 ms), the STA calculates the offset adjustment $A_t$ at step 2306 and applies $A_t$ to the TWT function through the TWT information field shown in FIG. 6. If $L_{e,t} \leq \alpha$, it means the offset is already small. Then no offset adjustment is needed at step 2306.

For current latency $L_{e,t}$ estimation, one option is to use the average $L_t$ in the last $N_e$ SPs, defined as:

$$L_{ave,t} = \text{avg}(L_t) \quad (1)$$

Another option is to use a weighted average. For values of $L_t$ which are taken closer to the current time, a larger weight is assigned ($\omega_i > \omega_{i-1}$), as follows:

$$L_{ave,t} = \sum_{i=0}^{N_e} \omega_i L_{t-i} \quad (2)$$

Yet another option is to use an exponential moving average, which can be defined as follows:

$$L_{ave,t} = L_{ave,t-1} + \theta(L_t - L_{ave,t-1}) \quad (3)$$

where $\theta$ is the decay rate for the exponential filter.

If the condition $L_{ave,t} > \alpha$ is satisfied, then the offset adjustment can be calculated as:

$$A_t = L_{ave,t} + T_{oh} \quad (4)$$

where $T_{oh}$ is a constant that is used to take into account the overhead of the control frame and some other overhead.

The above embodiments detail feedback based offset alignment, wherein the AP or STA (e.g., the TWT Requesting STA) is able to obtain traffic arrival information through feedback of timing information from the corresponding STA or AP, respectively, and align the offset accordingly. In other embodiments, offset alignment can be performed based on different information.

In some such embodiments, transmission control protocol (TCP) timestamp based offset alignment can be performed by using the timestamp information in a TCP packet to estimate the round trip latency. Based on the estimated round trip latency, the TWT offset can be aligned. In other embodiments, traffic density based offset alignment can be performed based on the knowledge that when the offset is well aligned, data packets have a relatively large inter-packet arrival time. Based on this feature, a traffic density based algorithm can be used to align the TWT offset.

Figure 24:
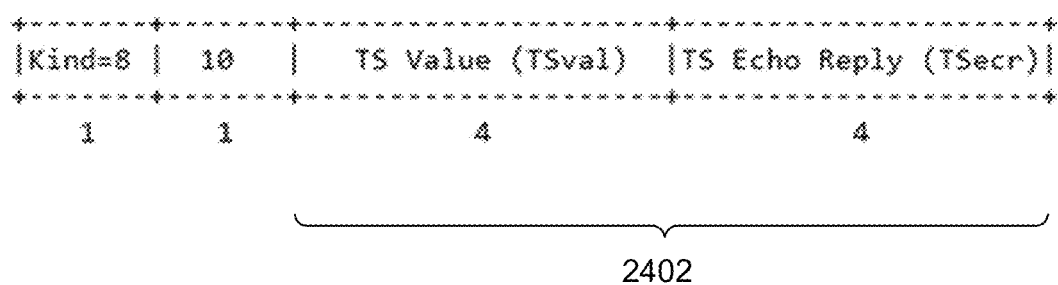
FIG. 24 illustrates the TCP timestamp format (i.e., the timestamp information in TCP) according to various embodiments of the present disclosure.

FIGS. 24-27 illustrate examples related to TCP timestamp based offset alignment. The TCP protocol supports timestamp echoing which could be used to estimate the latency. FIG. 24 illustrates the TCP timestamp format (i.e., the timestamp information in TCP). The first two fields are constant to identify the timestamp information in TCP frame. The timestamp information 2402 is carried in two four-byte timestamp fields. The TSval field contains the current value of the timestamp clock of the TCP sender. The TSecr field is valid if the ACK bit is set in the TCP header. If the ACK bit is not set in the outgoing TCP header, the sender of that segment should set the TSecr field to zero. When the ACK bit is set in an outgoing segment, the sender must echo a recently received TSval sent by the remote TCP in the TSval field.

With the TCP timestamp format, the STA performing as the TCP server or client can estimate the round-trip latency from the STA to the corresponding TCP client or server, respectively. If the AP side is performing as the TCP server or client, then the AP can also estimate the round-trip latency between the STA and the AP.

For an example in the case of wireless VR/AR glasses communicating with a mobile phone, the phone performs as the AP and the VR/AR glasses perform as the STA. The TCP traffic between the phone and the VR/AR glasses can be used by both sides to estimate the round-trip latency. As the traffic might be imbalanced between the two devices, the TSecr may not always be updated. For example, if the DL traffic is much more than the UL traffic, then many DL TCP packets will use the same TSecr. Therefore, the latency is calculated when a new TSecr value ($T_{ecr,n}$) is received. The estimated round-trip latency $T_{r,n}$ is determined as:

$$T_{r,n} = T_{clock} - T_{ecr,n} \quad (5)$$

where $T_{clock}$ is the current value of the timestamp clock in the TCP receiver side.

Figure 25:
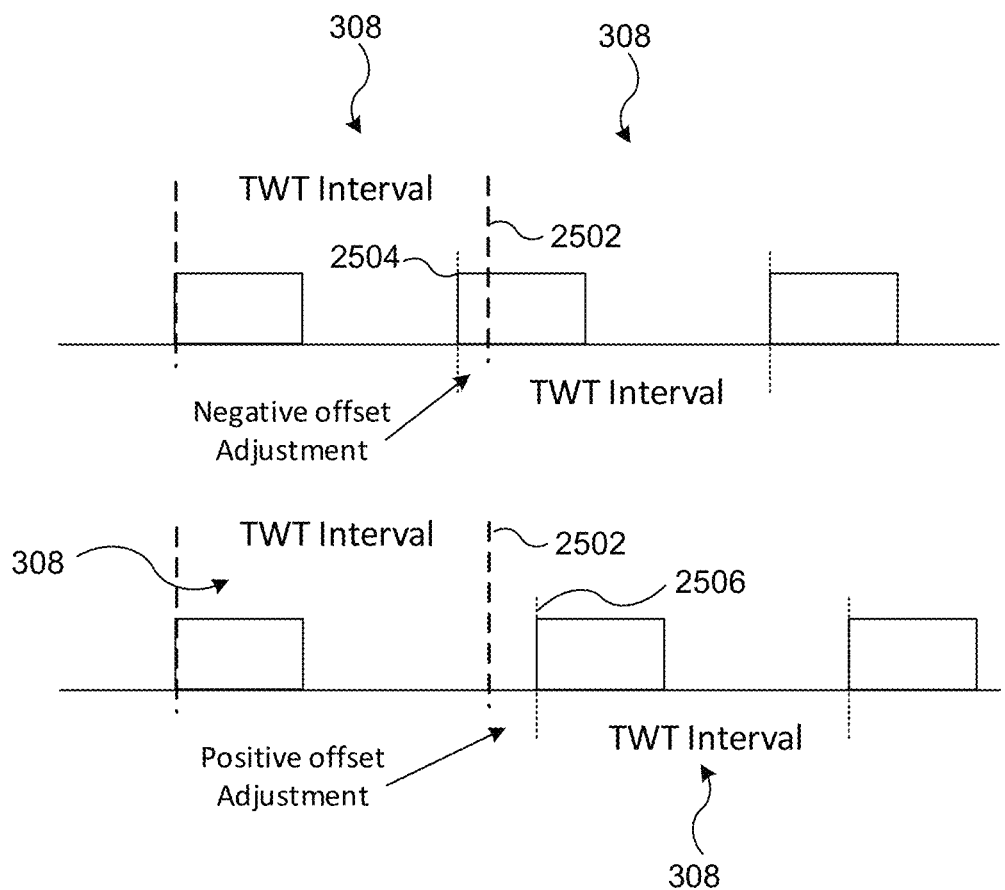
FIG. 25 illustrates different offset adjustment directions according to various embodiments of the present disclosure.

FIG. 25 illustrates different offset adjustment directions. If the TWT SP start time 2502 is shifted to an earlier time (e.g., time 2504), it is a negative offset adjustment. Positive offset adjustment corresponds to shifting the TWT SP start time to a later time (e.g., time 2506).

Figure 26:
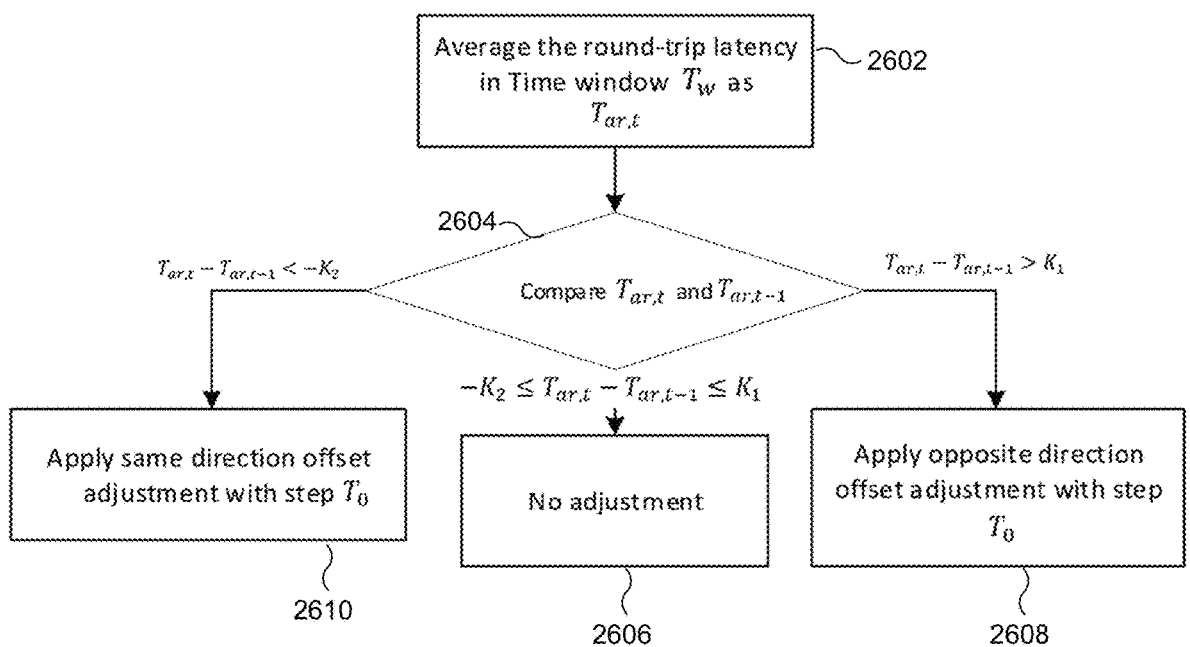
FIGS. 26-27 illustrate example processes for performing TWT offset adjustment based on the round-trip latency obtained from the TCP timestamp information according to various embodiments of the present disclosure.
Figure 27:
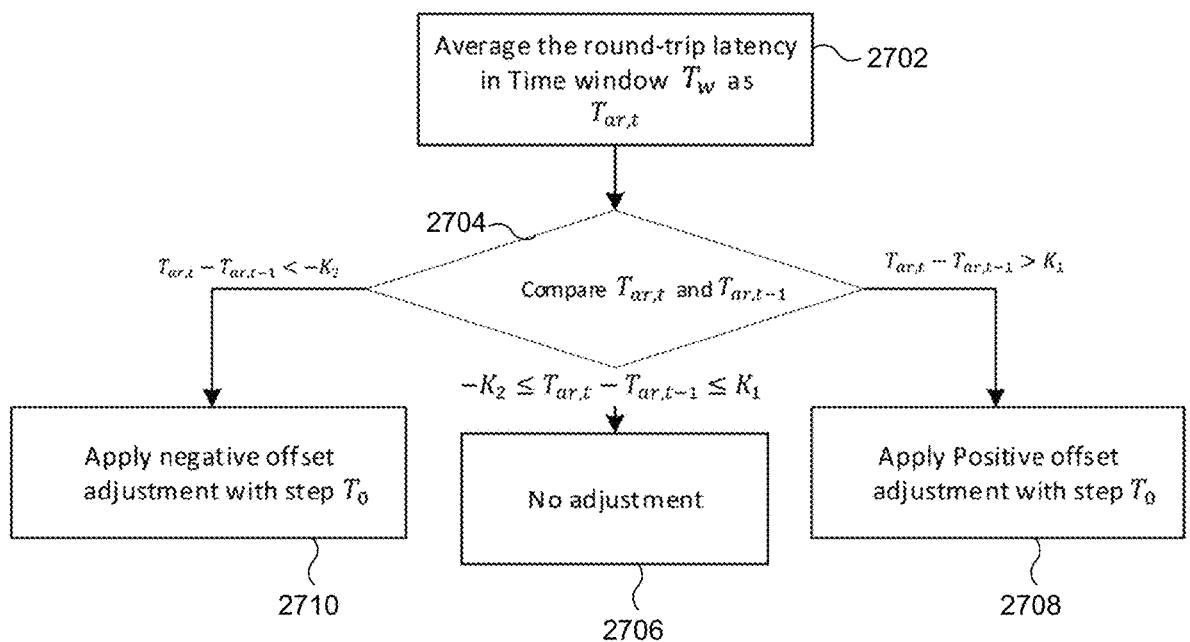

FIGS. 26-27 illustrate example processes for performing TWT offset adjustment based on the round-trip latency obtained from the TCP timestamp information according to various embodiments of the present disclosure. In the process of FIG. 26, at step 2602 the estimated round-trip latency $T_{r,n}$ is averaged within the time window $T_w$ to obtain $T_{ar,t}$, where t is a TWT SP index. When t=0, an offset adjustment is applied in a default adjustment direction (e.g., a negative offset adjustment is applied) in the amount of a predefined step $T_0$ (e.g., $T_0$=5 ms).

When t>0, the process moves to decision block 2604, where $T_{ar,t}$ is compared with $T_{ar,t-1}$. If the average latency has not notably changed since the last adjustment ($-K_2 \leq T_{ar,t}-T_{ar,t-1} \leq K_1$, where $K_1$ and $K_2$ are predefined positive numbers, e.g., $K_1$=$K_2$=2 ms), then no additional offset adjustment is needed (step 2606). Additionally, when the offset adjustment at t−1 is no adjustment (as in step 2606), then an offset adjustment is applied in the default adjustment direction in the amount of the step $T_0$.

If, at decision block 2604, the average latency has become notably larger since the last adjustment ($T_{ar,t}-T_{ar,t-1}>K_1$), then an offset adjustment is applied in the opposite direction from the previous offset adjustment in the amount of the step $T_0$ (step 2608). If the average latency has become notably smaller since the last adjustment ($T_{ar,t}-T_{ar,t-1}<-K_2$), then an offset adjustment is applied in the same direction as the previous offset adjustment in the amount of the step $T_0$ (step 2610).

In the alternative process of FIG. 27, at step 2702 the same procedure is applied as in step 2602 of FIG. 26 to average the estimated round-trip latency $T_{r,n}$ within the time window $T_w$ to obtain $T_{ar,t}$. Similarly, when t=0, the same default offset adjustment is applied as in FIG. 26, in a default adjustment direction (e.g., a negative offset adjustment is applied) in the amount of a predefined step $T_0$ (e.g., $T_0$=5 ms).

When t>0, the process moves to decision block 2704, where $T_{ar,t}$ is compared with $T_{ar,t-1}$ (similar to decision block 2604). If the average latency has not notably changed since the last adjustment ($-K_2 \leq T_{ar,t}-T_{ar,t-1} \leq K_1$, where $K_1$ and $K_2$ are predefined positive numbers, e.g., $K_1$=$K_2$=2 ms), then no additional offset adjustment is needed (step 2706), similar to step 2606.

If, at decision block 2704, the average latency has become notably larger since the last adjustment ($T_{ar,t}-T_{ar,t-1}>K_1$), then an offset adjustment is applied in the positive direction in the amount of the step $T_0$ (step 2708). If the average latency has become notably smaller since the last adjustment ($T_{ar,t}-T_{ar,t-1}<-K_2$), then an offset adjustment is applied in the negative direction in the amount of the step $T_0$ (step 2710).

Additionally, in the above embodiments the TWT interval can be adaptive to the average round-trip latency. If the maximum latency requirement of an application is $L_{rq}$, then the TWT interval can be set to:

$$I_{twt,t} = \max(L_{rq}-T_{ar,t}+T_g, I_{min}) \qquad (6)$$

where $T_9$ is a guard time constant, which is designed to protect against error in the estimation of the round-trip latency, and $I_{min}$ is the minimal TWT interval.

Figure 28:
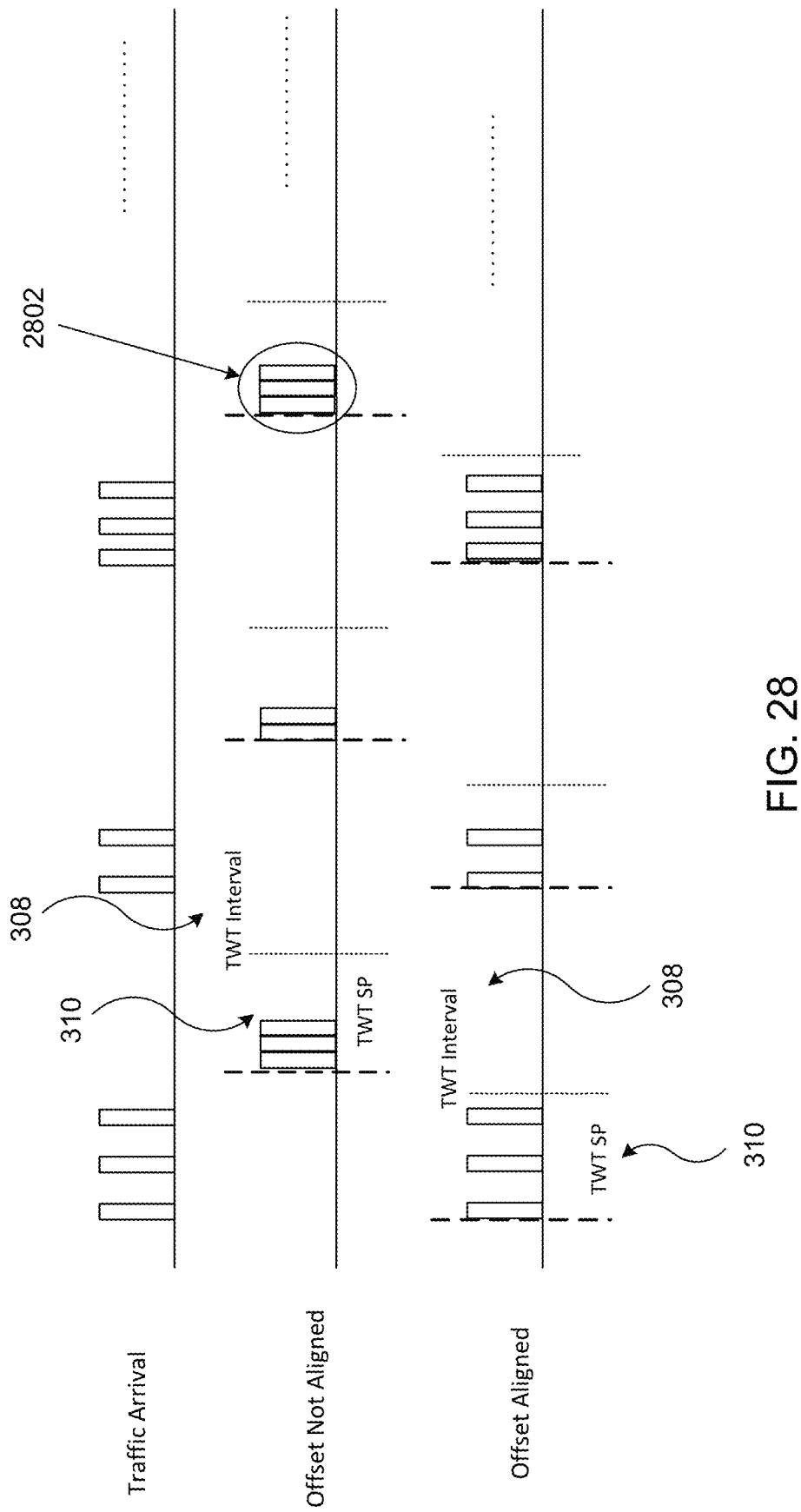
FIG. 28 illustrates an example of TWT offset alignment in the context of traffic density based offset alignment according to various embodiments of the present disclosure.
Figure 29:
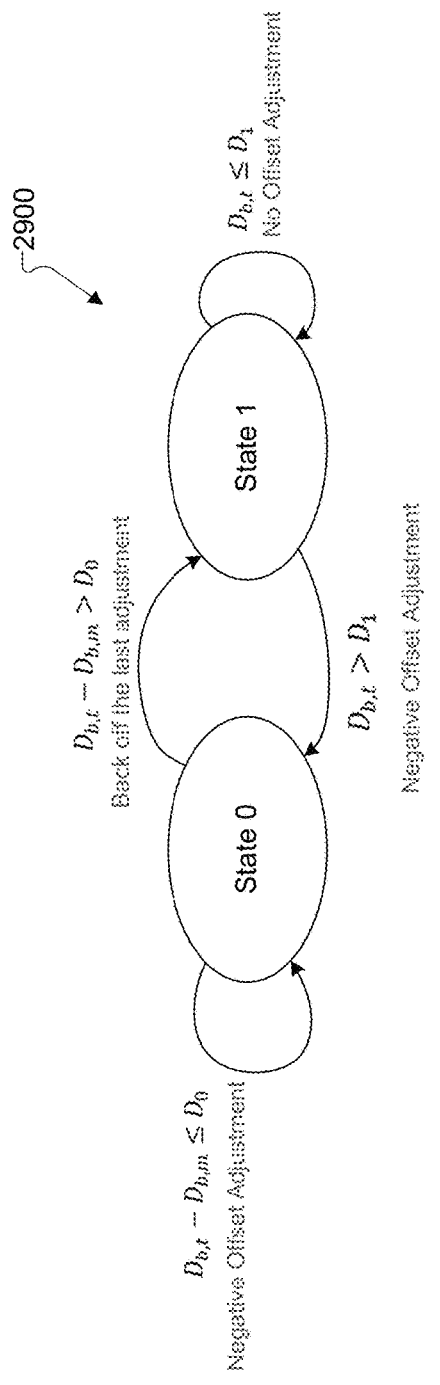
FIGS. 29-30 illustrate state machines representing example processes for traffic density based TWT offset adjustment according to various embodiments of the present disclosure.
Figure 30:
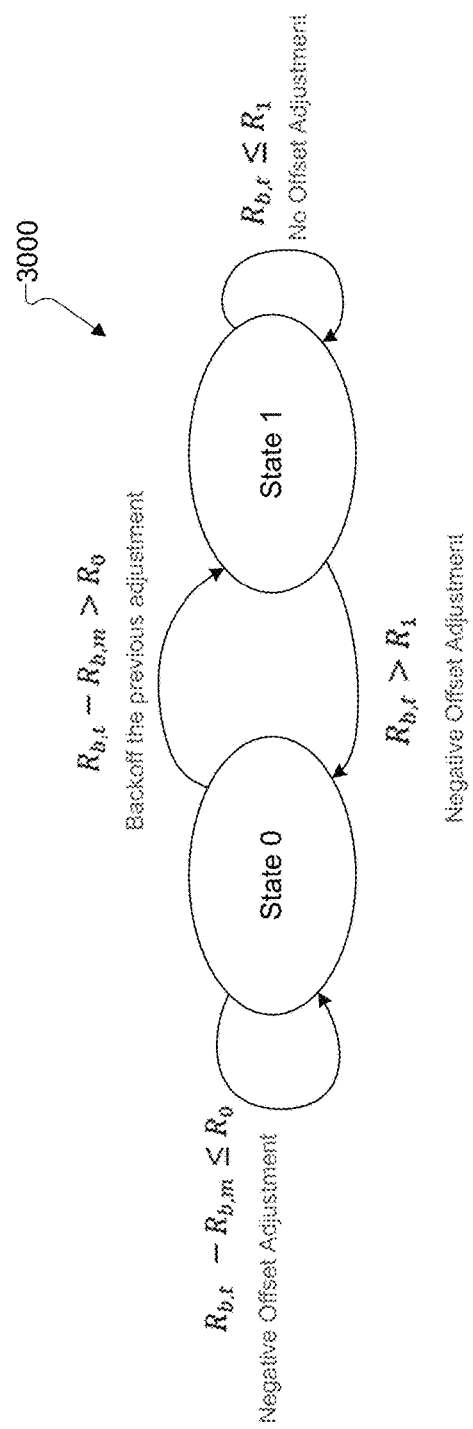

FIGS. 28-30 illustrate examples related to traffic density based offset alignment. In feedback based offset alignment and TCP timestamp based offset alignment, some kind of explicit timing information is required. In traffic density based offset alignment, no explicit timing information is required. This solution can be applied to cases in which the STA does not immediately go into doze mode after the buffered data is transmitted.

FIG. 28 illustrates an example of TWT offset alignment in the context of traffic density based offset alignment according to various embodiments of the present disclosure. As illustrated in FIG. 28, given the same TWT interval 308 and TWT SP duration 310, when the offset is better aligned, the dense region 2802, which corresponds to buffered data, is relatively small. Therefore, traffic density can be used to estimate/calculate the TWT offset alignment.

The first step in traffic density based offset alignment is to classify data as buffered data and non-buffered data. Buffered data refers to the case in which data arrives at the AP or STA and waits to be processed for transmission. Non-buffered data refers to the case in which the data arrives at the AP or STA and the MAC layer immediately processes it for transmission. Inter-packet arrival time can be used to classify the data as buffered data or non-buffered data. The starting time of a TWT SP is defined as $T_{a,0,t}$, where t is a TWT SP index, and the $n^{th}$ packet (counting both UL and DL packets) arrival time is defined as $T_{a,n,t}$. Then the inter-packet arrival time between the $n^{th}$ packet and $(n-1)^{th}$ packet is denoted as:

$$T_{a,(n-1,n),t} = T_{a,n,t} - T_{a,n-1,t}, n=1,2,3 \ldots \qquad (7)$$

To detect buffered data, the inter-packet arrival times in the $t^{th}$ TWT SP are compared to a constant value $T_B$ (e.g., $T_B$=2.1 ms) to evaluate the condition $T_{a,(n-1,n),t}>T_B$. When the $n^{th}$ packet in the $t^{th}$ TWT SP is found that satisfies this condition (denoted as $n_{b,t}$), the boundary between buffered data and non-buffered data is detected. Note that if $n_{b,t}$=1, then all of the data in the $t^{th}$ TWT SP is non-buffered data. Other clustering algorithms, such as density based spatial clustering of applications with noise (DBSCAN), can be used to estimate the buffered data period as well, in which case the first cluster can be treated as buffered data.

The duration of the buffered data ($D_{b,t}$) and the duration of the non-buffered data ($D_{n,t}$) in the $t^{th}$ TWT SP are then calculated as:

$$D_{b,t} = T_{a,n_b,-1,t} - T_{a,0,t} \qquad (8)$$

$$D_{n,t} = T_{a,N_t,t} - T_{a,n_b,-1,t} \qquad (9)$$

where $N_t$ is the total number of packets in the $t^{th}$ TWT SP, and $T_{a,N_t,t}$ is the arrival time of the last packet in the $t^{th}$ TWT SP.

FIG. 29 illustrates a state machine 2900 representing an example process for traffic density based TWT offset adjustment according to various embodiments of the present disclosure. The initial state of the state machine 2900 is State 0. In State 0, if the duration of the buffered data does not show a notable increment over the last M TWT SPs (i.e., the duration decreases or stays at a similar level, $D_{b,t}-D_{b,m} \leq D_0$), the state machine 2900 applies a negative offset adjustment in the amount of step $T_0$ (e.g., $T_0$=5 ms) and stays in State 0. A notable increment is defined as $D_{b,t}-D_{b,m}>D_0$, where $D_{b,m}$ is the minimal $D_{b,t}$ of the last M SPs (e.g., M=3) and $D_0$ is a predefined small constant value (e.g., 0.5 ms).

In State 0, if the duration of the buffered data shows a notable increment over the last M TWT SPs (i.e., $D_{b,t}-D_{b,m}>D_0$), then the state machine 2900 backs off the last offset adjustment and transitions to State 1. When backing off the last offset adjustment, the step can be changed to $D_b=T_{1s,t}-T_{sp,t}$, where $T_{1s,t}$ is the $1^{st}$ packet transmission time in the $t^{th}$ TWT SP and $T_{sp,t}$ is the starting time of the $t^{th}$ TWT SP.

In State 1, if the duration of the buffered data remains at a low level ($D_{b,t} \leq D_1$), then the state machine 2900 stays in State 1 with no offset adjustment. $D_1$ is defined as the duration of the buffered data at the time when the state machine 2900 transits from State 0 to State 1, plus $D_0$. If the duration of the buffered data becomes larger than $D_1$ (i.e., $D_{b,t}>D_1$), then the state machine 2900 will transition from State 1 to State 0, and apply a negative offset adjustment in the amount of step $T_0$.

FIG. 30 illustrates a state machine 3000 representing an alternative example process for traffic density based TWT offset adjustment according to various embodiments of the present disclosure. State machine 3000 is similar to state machine 2900, except that the ratio $$R_{b,t} = \frac{D_{b,t}}{D_{b,t} + D_{n,t}}$$

is used instead of $D_{b,t}$ in the state transition conditions. $R_{b,m}$ is the minimal $R_{b,t}$ of the last M TWT SPs, $R_0$ is a predefined constant value which can be tuned (or can be adaptive as well), and $R_1$ is $R_{b,t}$ at the time when the state machine 3000 transitions to State 1, plus $R_0$.

Figure 31:
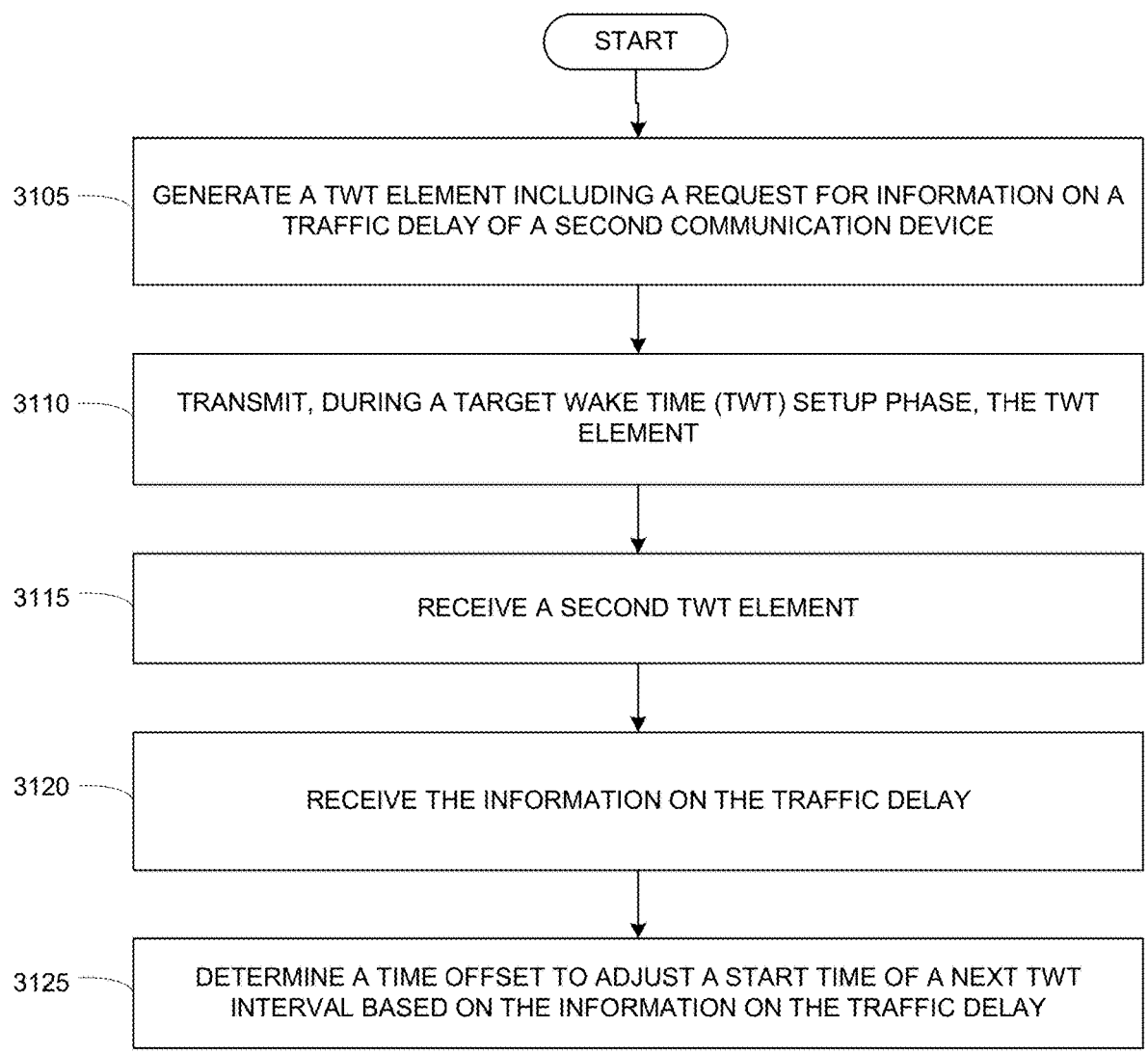
FIG. 31 illustrates an example process for obtaining timing information and performing a time adjustment offset for TWT operations according to various embodiments of the present disclosure.

FIG. 31 illustrates an example process for obtaining timing information and performing a time adjustment offset for TWT operations according to various embodiments of the present disclosure. The process of FIG. 31 is discussed as being performed by a first communication device that is a requesting-side STA (e.g., a TWT Requesting STA or TWT Requesting STA affiliated with an MLD), but it is understood that a second communication device that is the corresponding responding-side STA (e.g., a TWT Responding STA or TWT Responding STA affiliated with an MLD) performs a corresponding process. Additionally, for convenience, the process of FIG. 31 is discussed as being performed by a WI-FI STA, but it is understood that any suitable wireless communication device could perform these processes.

Referring to FIG. 31, the process begins with the first communication device generating a TWT element that includes a request for information on a traffic delay of the second communication device (step 3105). The request can be for information on the traffic delay for all traffic identifiers (TIDs) or for a subset of the TIDs. The TWT element is generated to include a first binary subfield in a first control field that indicates the request for the information on the traffic delay of the second communication device. If the request is for a subset of the TIDs, the TWT element is generated to include a second binary subfield that indicates a bitmap corresponding to the TIDs for which the information on the traffic delay is requested. The first binary subfield of the first control field of the TWT element is represented by one of a sixth or seventh bit of the first control field and the second binary subfield is appended to a TWT Parameter Set field within the TWT element.

If the first communication device is one of a first plurality of STAs affiliated with a first MLD, and the second communication device is one of a second plurality of STAs affiliated with a second MLD (i.e., operating in MLO), then at step 3105 the first communication device generates the TWT element to include a request for information on a traffic delay of the second plurality of STAs.

Next, the first communication device transmits, during a TWT setup phase, the TWT element to the second communication device (step 3110). In some embodiments of step 3110, the first communication device transmits a comprehensive traffic delay request element including a request for the information on the traffic delay and information on each of a queueing delay, a contention delay, a defer delay, and a receiver/transmitter delay of the second communication device.

If the first communication device is operating in MLO, then a plurality of links are setup between the STAs affiliated with the first MLD and the STAs affiliated with the second MLD. In this case, at step 3110, the first communication device transmits the TWT element over one of the links (i.e., a negotiating link) to the second communication device.

Then, the first communication device receives a second TWT element from the second communication device (step 3115). The second TWT element includes a third binary subfield in a first control field of the second TWT element, the third binary subfield indicating a response to the request for the information on the traffic delay of the second communication device, the response indicating whether the request is accepted or rejected. The third binary subfield of the first control field of the second TWT element is represented by one of a sixth or seventh bit of the first control field. If the response indicates that the request is accepted for a subset of the requested TIDs, a fourth binary subfield in a second control field of the second TWT element indicates presence of a bitmap that indicates the subset of the requested TIDs that are accepted for providing the information on the traffic delay.

The first communication device then receives the information on the traffic delay from the second communication device (step 3120). The information on the traffic delay may be received in a traffic delay information element in a frame, or in a traffic delay information control frame. The traffic delay information element or the traffic delay information control frame includes a first subfield including a bitmap that indicates a subset of TIDs for which the information on the traffic delay is present, and a second subfield including the information on the traffic delay for each of the subset of TIDs. If, at step 3110, the first communication device transmitted a comprehensive traffic delay request element, then at step 3120 the first communication device receives a traffic delay response element including the requested information.

If the first communication device is operating in MLO, then at step 3120 the first communication device receives from the second communication device, over the one link (i.e., the negotiating link), the information on the traffic delay of the second plurality of communication devices.

Finally, the first communication device determines a time offset to adjust a start time of a next TWT interval based on the information on the traffic delay (step 3125). In some embodiments, the time offset is determined based on the information on the traffic delay of the second communication device, as an average of the traffic delay of the second communication device over one or more TWT intervals. In some embodiments, the time offset is determined based on an estimate of round-trip latency to the second communication device that is based on information on a TCP timestamp received from the second communication device. In other embodiments, the time offset is determined based on information on a density of buffered data packets received from the second communication device in at least one previous TWT interval of the first communication device.

The above flowchart illustrates an example method that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Returning to the discussion of traffic delay information above, in some embodiments, a STA (e.g., a transmitting STA) can send unsolicited traffic delay information to another STA. In such embodiments, a transmitting STA can send the traffic delay information to another STA without receiving a request for such information from the other STA. The STA can send the information for any or all TIDs. The information can also be sent for any or all TIDs and for any or all enabled links between an AP MLD and a non-AP MLD. In some embodiments, other delay information (such as delay bound, etc.) can also be considered as the traffic delay information in the present disclosure. Such delay information can be indicated to be for specific TIDs. In some embodiments, delay information can be requested or sent outside the context of TWT operation.

Figure 32:
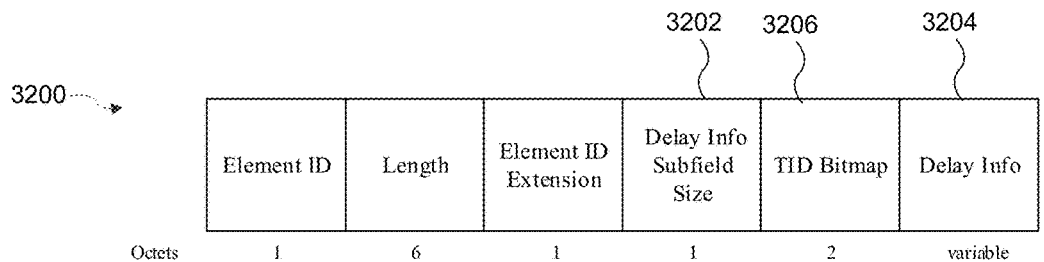
FIG. 32 illustrates an example Delay Information element format according to various embodiments of the present disclosure.

In an embodiment, a transmitting STA can include Delay Information element in any frame transmitted to another STA in order to convey the delay information at the transmitting STA's end. FIG. 32 illustrates an example Delay Information element format 3200 according to various embodiments of the present disclosure. In the Delay Information element format 3200, Delay Info Subfield Size field 3202 determines the size of the Delay Info subfield 3204. The TID Bitmap subfield 3206 contains the bitmap for TIDs for which delay information is included in the Delay Information element. If the bit corresponding to $k^{th}$ position in the TID Bitmap subfield is set to 1, it indicates that the delay for the $k^{th}$ TID is included in the Delay Information element. If the bit is set to 0, it indicates that delay information is not included for the $k^{th}$ TID.

The Delay Info subfield 3204 contains the delay information for different TIDs. For each TID, there can be two octets for delay information, although any number of octets may be used. In the Delay Info subfield 3204, octets for delay information for different TIDs are cascaded. The TIDs for which delay information are included in the Delay Info subfield 3204 are indicated by the TID bitmap in TID Bitmap subfield 3206. For example, if the TID bitmap in the TID Bitmap subfield 3206 is [0 1 1 0 0 1 0 0 0 0 0 0 0 0 0 0], it would indicate that the Delay Info subfield 3204 will contain delay information for 3 TIDs (corresponding to 3 ones in TID Bitmap subfield). If two octets are used for representing traffic delay information for each TID, then the Delay Info subfield 3204 would be 6 octets long, in this example. The first two octets in the Delay Info subfield 3204 would contain the delay information corresponding to TID 2, the second two octets in the Delay Info subfield 3204 would contain the delay information corresponding to TID 3, and the final two octets in the Delay Info subfield 3204 would contain the delay information corresponding to TID 6.

In another embodiment, the Delay Info Subfield Size subfield 3202 may not be present in the Delay Information element. In that case, the size of the Delay Info subfield 3204 can be determined based on the number of ones in the Delay Info TID Bitmap and the number octets used to encapsulate the delay information per TID. For example, if the TID bitmap in the TID Bitmap subfield 3206 is [0 1 1 0 0 1 1 0 0 0 0 0 0 0 0 0] and 2 octets are used to represent traffic delay information for each TID, then the size of the Delay Info subfield 3204 is 8 octets.

Figure 33:
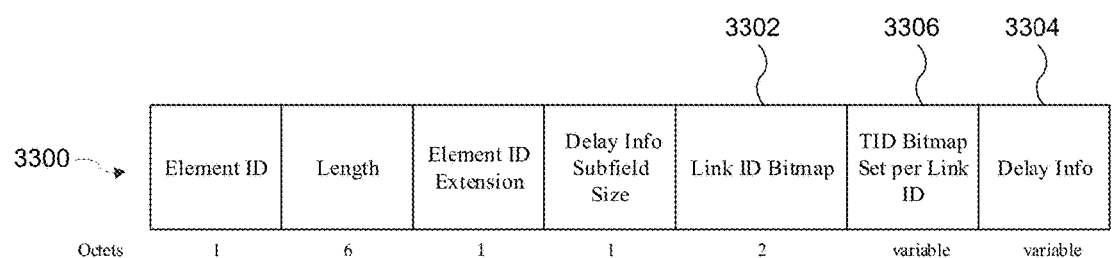
FIG. 33 illustrates an example Multi-Link Delay Information element format according to various embodiments of the present disclosure.

In some embodiments, an MLD (e.g., a transmitting MLD) can include a Multi-Link Delay Information element in any frame transmitted to another MLD over any setup link in order to convey the delay information at the transmitting MLD's end corresponding to one or multiple setup links between the two MLDs. FIG. 33 illustrates an example Multi-Link Delay Information element format 3300 according to various embodiments of the present disclosure. The Link ID Bitmap subfield 3302 in the Multi-Link Delay Information element format 3300 indicates the bitmap for the links for which Delay information is provided (i.e., the Link ID Bitmap). In the Delay Info subfield 3304, the delay information for all the indicated TIDs will be provided for the first indicated Link ID and then all indicated TIDs for the second Link ID and so on. For each Link ID indicated in the Link ID Bitmap as 1, there will be two octets in the TID Bitmap Set per Link ID subfield 3306.

Figure 34:
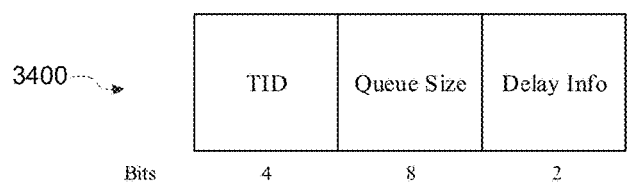
FIG. 34 illustrates an example Low-latency QoS Control field format according to various embodiments of the present disclosure.

In some embodiments, the delay information can be provided in conjunction with the queue sizes for the corresponding TIDs. For example, a Delay Information element or Multi-Link Delay Information element can be provided along with a Buffer status report included in the same frame. In some embodiments, the existing QoS Control field can be modified. The Low-latency QoS Control field can include both Queue size and Delay Information. FIG. 34 illustrates an example Low-latency QoS Control field format 3400 according to various embodiments of the present disclosure.

Figure 35:
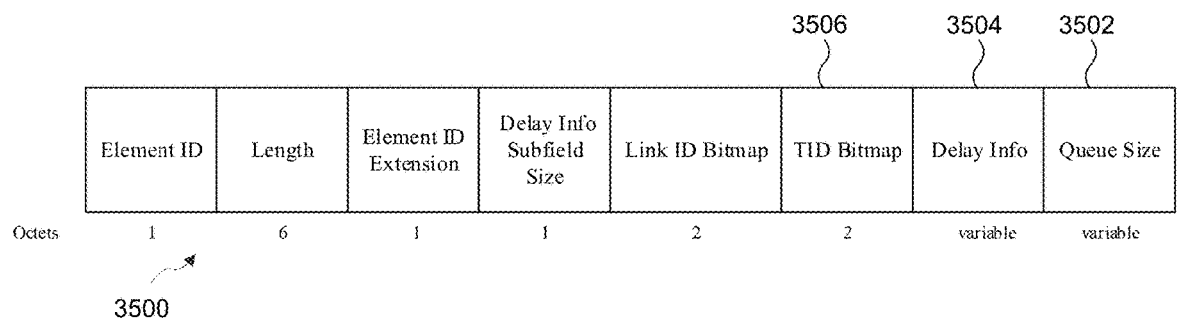
FIG. 35 illustrates an example Multi-Link Low-Latency Delay Information element format according to various embodiments of the present disclosure.

In yet other embodiments, queue size and delay information can be provided in a single element for multiple TIDs and for multiple links between two MLDs using a Multi-Link Low-Latency Delay Information element. FIG. 35 illustrates an example Multi-Link Low-Latency Delay Information element format 3500 according to various embodiments of the present disclosure. The order of information in the Queue Size subfield 3502 in the Multi-Link Low-Latency Delay Information element format 3500 is in the same order as information in the Delay Info subfield 3504. In other embodiments, Queue Size and Delay Info can be per access category (AC) instead of per TID. In that case, the TID Bitmap subfield 3506 can be replaced by an AC Bitmap subfield. This can be thought of as a modification of a Buffer Status Report (BSR) Control subfield in a Buffer Status Report (BSR).

According to other embodiments, variation of the format 3500 of the Multi-Link Low-Latency Delay Information element is possible. For example, delay bound and traffic delay information for a TID can be placed in the same information element, where delay bound for the corresponding TID is defined as the maximum amount of time the STA is expected to elapse in order to complete transmission of the specified amount of packets. This is the time duration $t_4-t_3$, where $t_3$ is the time when the BSR is transmitted by the STA/AP, and $t_4$ is the time when the AP/STA requests the STA/AP to start transmission of the packets specified in this variant of the Multi-Link Low-Latency Delay Information element.

According to some embodiments, the Multi-Link Low-Latency Delay Information element or its variant carrying TID information, corresponding queue size information, delay bound information, and traffic delay information can be requested by either an AP or a non-AP STA. According to some other embodiments, the Multi-Link Low-Latency Delay Information element or its variant carrying TID information, corresponding queue size information, delay bound information, and traffic delay information can be transmitted by either an AP or a non-AP STA. According to yet other embodiments, a Delay Unit subfield can be included in a variant of Multi-Link Low-Latency Delay Information element format 3500, where the Delay Unit subfield indicates the unit of delay applicable for delay bound information or traffic delay information included in the Multi-Link Low-Latency Delay Information element variant. According to another embodiment, traffic delay information or delay bound information can be included in a variant of the BSR Control subfield or a variant of the QoS Control field in a QoS Data/Null frame.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first communication device comprising:
    a transceiver configured to:
        transmit, during a target wake time (TWT) setup phase, a TWT element including a request for information on a traffic delay of a second communication device, wherein the traffic delay is a processing delay faced by traffic of the second communication device before the traffic becomes ready for departure from the second communication device; and
        receive the information on the traffic delay; and
    a processor operably coupled to the transceiver, the processor configured to determine a time offset to adjust a start time of a next TWT interval based on the information on the traffic delay,
    wherein the transceiver is further configured to transmit an indication of the adjusted start time of the next TWT interval based on the time offset.

2. The first communication device of claim 1, wherein:
    the request is for information on the traffic delay for all traffic identifiers (TIDs) or for a subset of the TIDs,
    the processor is configured to generate the TWT element to include:
        a first binary subfield in a first control field of the TWT element that indicates the request for the information on the traffic delay of the second communication device; and
        based on the request being for the subset of the TIDs, a second binary subfield in the TWT element that indicates a bitmap corresponding to the TIDs for which the information on the traffic delay is requested, and
    the first binary subfield of the first control field of the TWT element is represented by one of a sixth or seventh bit of the first control field and the second binary subfield is appended to a TWT Parameter Set field within the TWT element.

3. The first communication device of claim 1, wherein the transceiver is further configured to:
    receive a second TWT element including a third binary subfield in a first control field of the second TWT element, the third binary subfield indicating a response to the request for the information on the traffic delay of the second communication device, the response indicating whether the request is accepted or rejected,
    wherein, based on the response indicating that the request is accepted for a subset of requested TIDs, a fourth binary subfield in a second control field of the second TWT element indicates presence of a bitmap that indicates the subset of the requested TIDs that are accepted for providing the information on the traffic delay, and
    wherein the third binary subfield of the first control field of the second TWT element is represented by one of a sixth or seventh bit of the first control field.

4. The first communication device of claim 1, wherein the transceiver is further configured to:
    receive the information on the traffic delay in a traffic delay information element in a frame, or in a traffic delay information control frame,
    wherein the traffic delay information element or the traffic delay information control frame includes a first subfield including a bitmap that indicates a subset of traffic identifiers (TIDs) for which the information on the traffic delay is present, and a second subfield including the information on the traffic delay for each of the subset of TIDs.

5. The first communication device of claim 1, wherein:
    the first communication device is a first multi-link device (MLD) having more than one affiliated station and the second communication device is a second MLD having more than one affiliated station,
    a plurality of links are setup between the first MLD and the second MLD, and
    the transceiver is further configured to:
        transmit, over one of the links, the TWT element, including a request for information on a traffic delay of one or more stations of the second MLD; and
        receive, over the one of the links, the information on the traffic delay of the one or more stations of the second MLD.

6. The first communication device of claim 1, wherein the transceiver is configured to:
    transmit a comprehensive traffic delay request element including a request for the information on the traffic delay and information on each of a queueing delay, a contention delay, a defer delay, and a receiver/transmitter delay of the second communication device; and
    receive a traffic delay response element including the requested information.

7. The first communication device of claim 1, wherein the processor is further configured to:
    determine the time offset, based on the information on the traffic delay of the second communication device, as an average of the traffic delay of the second communication device over one or more TWT intervals; or
    determine the time offset based on an estimate of round-trip latency to the second communication device that is based on information on a transmission control protocol (TCP) timestamp received from the second communication device; or
    determine the time offset based on information on a density of buffered data packets received from the second communication device in at least one previous TWT interval of the first communication device.

8. A method performed by a first communication device, comprising:
    transmitting, during a target wake time (TWT) setup phase, a TWT element including a request for information on a traffic delay of a second communication device, wherein the traffic delay is a processing delay faced by traffic of the second communication device before the traffic becomes ready for departure from the second communication device;
    receiving the information on the traffic delay;

determining a time offset to adjust a start time of a next TWT interval based on the information on the traffic delay; and transmitting an indication of the adjusted start time of the next TWT interval based on the time offset.

9. The method of claim 8, wherein:

the request is for information on the traffic delay for all traffic identifiers (TIDs) or for a subset of the TIDs, the method further comprises generating the TWT element to include:
- a first binary subfield in a first control field of the TWT element that indicates the request for the information on the traffic delay of the second communication device; and
- based on the request being for the subset of the TIDs, a second binary subfield in the TWT element that indicates a bitmap corresponding to the TIDs for which the information on the traffic delay is requested, and the first binary subfield of the first control field of the TWT element is represented by one of a sixth or seventh bit of the first control field and the second binary subfield is appended to a TWT Parameter Set field within the TWT element.

10. The method of claim 8, further comprising:

receiving a second TWT element including a third binary subfield in a first control field of the second TWT element, the third binary subfield indicating a response to the request for the information on the traffic delay of the second communication device, the response indicating whether the request is accepted or rejected, wherein, based on the response indicating that the request is accepted for a subset of requested TIDs, a fourth binary subfield in a second control field of the second TWT element indicates presence of a bitmap that indicates the subset of the requested TIDs that are accepted for providing the information on the traffic delay, and wherein the third binary subfield of the first control field of the second TWT element is represented by one of a sixth or seventh bit of the first control field.

11. The method of claim 8, further comprising:

receiving the information on the traffic delay in a traffic delay information element in a frame, or in a traffic delay information control frame, wherein the traffic delay information element or the traffic delay information control frame includes a first subfield including a bitmap that indicates a subset of traffic identifiers (TIDs) for which the information on the traffic delay is present, and a second subfield including the information on the traffic delay for each of the subset of TIDs.

12. The method of claim 8, wherein:

the first communication device is one of a first plurality of communication devices affiliated with a first multi-link device (MLD) and the second communication device is one of a second plurality of communication devices affiliated with a second MLD, a plurality of links are setup between the first plurality of communication devices affiliated with the first MLD and the second plurality of communication devices affiliated with the second MLD, and the method further comprises:
- transmitting, over one of the links, the TWT element, including a request for information on a traffic delay of the second plurality of communication devices; and
- receiving, over the one of the links, the information on the traffic delay of the second plurality of communication devices.

13. The method of claim 8, further comprising:

transmitting a comprehensive traffic delay request element including a request for the information on the traffic delay and information on each of a queueing delay, a contention delay, a defer delay, and a receiver/transmitter delay of the second communication device; and receiving a traffic delay response element including the requested information.

14. The method of claim 8, further comprising:

determining the time offset, based on the information on the traffic delay of the second communication device, as an average of the traffic delay of the second communication device over one or more TWT intervals; or determining the time offset based on an estimate of round-trip latency to the second communication device that is based on information on a transmission control protocol (TCP) timestamp received from the second communication device; or determining the time offset based on information on a density of buffered data packets received from the second communication device in at least one previous TWT interval of the first communication device.

15. A second communication device comprising:

a transceiver configured to:
- receive, during a target wake time (TWT) setup phase, a TWT element including a request for information on a traffic delay of the second communication device, wherein the traffic delay is a processing delay faced by traffic of the second communication device before the traffic becomes ready for departure from the second communication device; and
- transmit the information on the traffic delay, wherein a time offset to adjust a start time of a next TWT interval is determined based on the information on the traffic delay, and wherein the transceiver is further configured to receive an indication of the adjusted start time of the next TWT interval based on the time offset.

16. The second communication device of claim 15, wherein:

the request is for information on the traffic delay for all traffic identifiers (TIDs) or for a subset of the TIDS, the TWT element includes:
- a first binary subfield in a first control field of the TWT element that indicates the request for the information on the traffic delay of the second communication device; and
- based on the request being for the subset of the TIDs, a second binary subfield in the TWT element that indicates a bitmap corresponding to the TIDs for which the information on the traffic delay is requested, and the first binary subfield of the first control field of the TWT element is represented by one of a sixth or seventh bit of the first control field and the second binary subfield is appended to a TWT Parameter Set field within the TWT element.

17. The second communication device of claim 15, wherein the transceiver is further configured to:

transmit a second TWT element including a third binary subfield in a first control field of the second TWT element, the third binary subfield indicating a response to the request for the information on the traffic delay of the second communication device, the response indicating whether the request is accepted or rejected, wherein, based on the response indicating that the request is accepted for a subset of requested TIDs, a fourth binary subfield in a second control field of the second TWT element indicates presence of a bitmap that indicates the subset of the requested TIDs that are accepted for providing the information on the traffic delay, and wherein the third binary subfield of the first control field of the second TWT element is represented by one of a sixth or seventh bit of the first control field.

18. The second communication device of claim 15, wherein the transceiver is further configured to:

transmit the information on the traffic delay in a traffic delay information element in a frame, or in a traffic delay information control frame, wherein the traffic delay information element or the traffic delay information control frame includes a first subfield including a bitmap that indicates a subset of traffic identifiers (TIDs) for which the information on the traffic delay is present, and a second subfield including the information on the traffic delay for each of the subset of TIDs.

19. The second communication device of claim 15, wherein:

a first communication device is a first multi-link device (MLD) having more than one affiliated station and the second communication device is a second MLD having more than one affiliated station, a plurality of links are setup between the first MLD and the second MLD, and the transceiver is further configured to:

receive, over one of the links, the TWT element, including a request for information on a traffic delay of one or more stations of the second MLD operating on the plurality of links; and transmit, over the one of the links, the information on the traffic delay of the one or more stations of the second MLD.

20. The second communication device of claim 15, wherein the transceiver is configured to:

receive a comprehensive traffic delay request element including a request for the information on the traffic delay and information on each of a queueing delay, a contention delay, a defer delay, and a receiver/transmitter delay of the second communication device, and transmit a traffic delay response element including the requested information.

* * * * *